US008295802B2

(12) United States Patent
Nagoya

(10) Patent No.: US 8,295,802 B2
(45) Date of Patent: Oct. 23, 2012

(54) COMMUNICATION CONTROL DEVICE AND COMMUNICATION CONTROL METHOD FOR AN EMERGENCY CALL OVER THE INTERNET

(75) Inventor: Mitsugu Nagoya, Tokyo (JP)

(73) Assignee: Duaxes Corporation (JP)

( * ) Notice: Subject to any disclaimer, the term of this patent is extended or adjusted under 35 U.S.C. 154(b) by 0 days.

(21) Appl. No.: 12/307,551

(22) PCT Filed: Jul. 4, 2006

(86) PCT No.: PCT/JP2006/313335
§ 371 (c)(1),
(2), (4) Date: Apr. 8, 2009

(87) PCT Pub. No.: WO2008/004283
PCT Pub. Date: Jan. 10, 2008

(65) Prior Publication Data
US 2009/0247115 A1 Oct. 1, 2009

(51) Int. Cl.
*H04M 11/04* (2006.01)
(52) U.S. Cl. .......... 455/404.1; 455/426.1; 455/502; 455/517; 455/555; 455/552.1; 455/567; 370/352; 370/338; 370/401; 370/422
(58) Field of Classification Search .......... 455/404.1, 455/426.1, 452.1, 502, 517, 550.1, 555, 552.1, 455/567; 370/395.2, 352, 338, 401, 410, 370/422; 709/224, 227
See application file for complete search history.

(56) References Cited

U.S. PATENT DOCUMENTS

| | | | |
|---|---|---|---|
| 5,937,344 A * | 8/1999 | Zicker | 455/404.1 |
| 7,050,785 B2 * | 5/2006 | Islam et al. | 455/404.1 |
| 7,065,061 B1 * | 6/2006 | Zellner et al. | 370/329 |
| 7,161,933 B2 * | 1/2007 | Stanford | 370/352 |
| 7,190,947 B2 * | 3/2007 | Binzel et al. | 455/404.1 |
| 7,680,121 B2 * | 3/2010 | Ogawa et al. | 370/395.2 |

(Continued)

FOREIGN PATENT DOCUMENTS

JP 4-180425 6/1992

(Continued)

OTHER PUBLICATIONS

International Search Report dated Aug. 22, 2006 (English & Japanese) issued in related Application No. PCT/JP2006/313336, 2 pages.

(Continued)

*Primary Examiner* — Shaima Q Aminzay
(74) *Attorney, Agent, or Firm* — Martin E. Hsia

(57) ABSTRACT

A communication control apparatus includes a database which stores identification information of a party on the other end of communication with whom communication should be controlled, a search circuit which acquires communication data for requesting a connection to a party on the other end of communication and searches the database for the identification information of the party on the other end of communication, and a control unit which, if the identification information of the party on the other end of communication is found in the database, transmits a connection termination request to a terminal of the transmission source, and further transmits a connection request thereto so as to establish, in place of the party on the other end of communication, a connection with the terminal of the transmission source of the communication data and controls communication between the transmission source and the party on the other end of communication.

8 Claims, 22 Drawing Sheets

U.S. PATENT DOCUMENTS

| | | | |
|---|---|---|---|
| 2004/0176066 A1* | 9/2004 | Binzel et al. | 455/404.1 |
| 2006/0013195 A1* | 1/2006 | Son et al. | 370/352 |
| 2007/0019658 A1* | 1/2007 | Park et al. | 370/410 |
| 2009/0238344 A1* | 9/2009 | Nagoya | 379/45 |

FOREIGN PATENT DOCUMENTS

| | | | |
|---|---|---|---|
| JP | 2002-171571 | | 6/2002 |
| JP | 2002-537741 | | 11/2002 |
| JP | 2005-27247 | * | 1/2005 |
| JP | 2005-286638 | | 10/2005 |

OTHER PUBLICATIONS

Patent Abstracts of Japan, Publication No. 2005-027247 dated Jan. 27, 2005, 1 page.

Patent Abstracts of Japan, Publication No. 2002-171571 dated Jun. 14, 2002, 1 page.

Notification for Reasons for Refusal for JP2006-541527 dated Jan. 23, 2007 (original Japanese-language version, 2 pages; English translation thereof, 2 pages and verification of translation, 1 page) (5 pages total).

"MITI Sponsored Business Extended function in the prototype of a risk analysis system in a plant network security, Research paper, Security Center, Iformation-Technology Promotion Agency, Japan, Mar. 2000 pp. 2-14 (p. 14, Chapter 2) and pp. 3-15 (p. 15, chapter 3)" (2 pages).

http://www.ipa.go.jp/security//////////fy11/report/contents/intrusion/plant_risk/ptfta99.pdf dated Mar. 2000 (97 pages).

International Search Report (English & Japanese) for PCT/JP2006/313335 mailed Aug. 22, 2006 (2 pages).

Patent Abstract for JP 2002-537741 dated Nov. 5, 2002 (1 page).

Patent Abstracts of Japan 2005-286638 dated Oct. 13, 2005 (1 page).

Patent Abstracts of Japan 04-180425 dated Jun. 26, 1992 (1 page).

* cited by examiner

FIG.14

| URL |
| --- |
| http://www.xxx.xxx/x5.html |
| http://www.xx.xx/******** |
| ⋮ |

| 62 | 64 |
| --- | --- |
| MATCHED | PERMIT |
| NOT MATCHED | DISCARD |

| 62 | 64 |
| --- | --- |
| 0 | PERMIT |
| 3 | DISCARD |
| 4 | REPLACEMENT |
| 7 | ROUTING |
| 8 | SWITCHING |
| ⋮ | ⋮ |

60

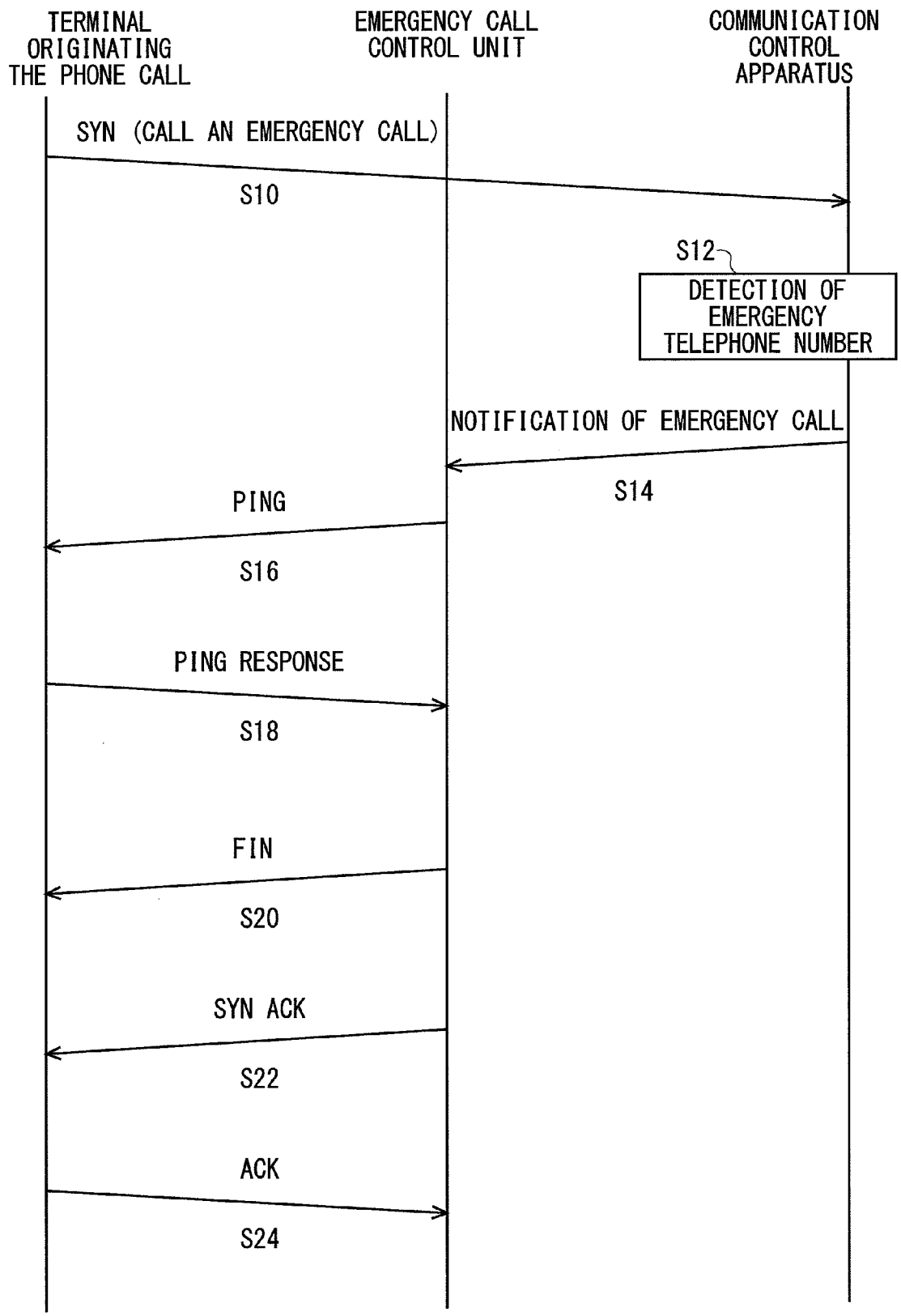

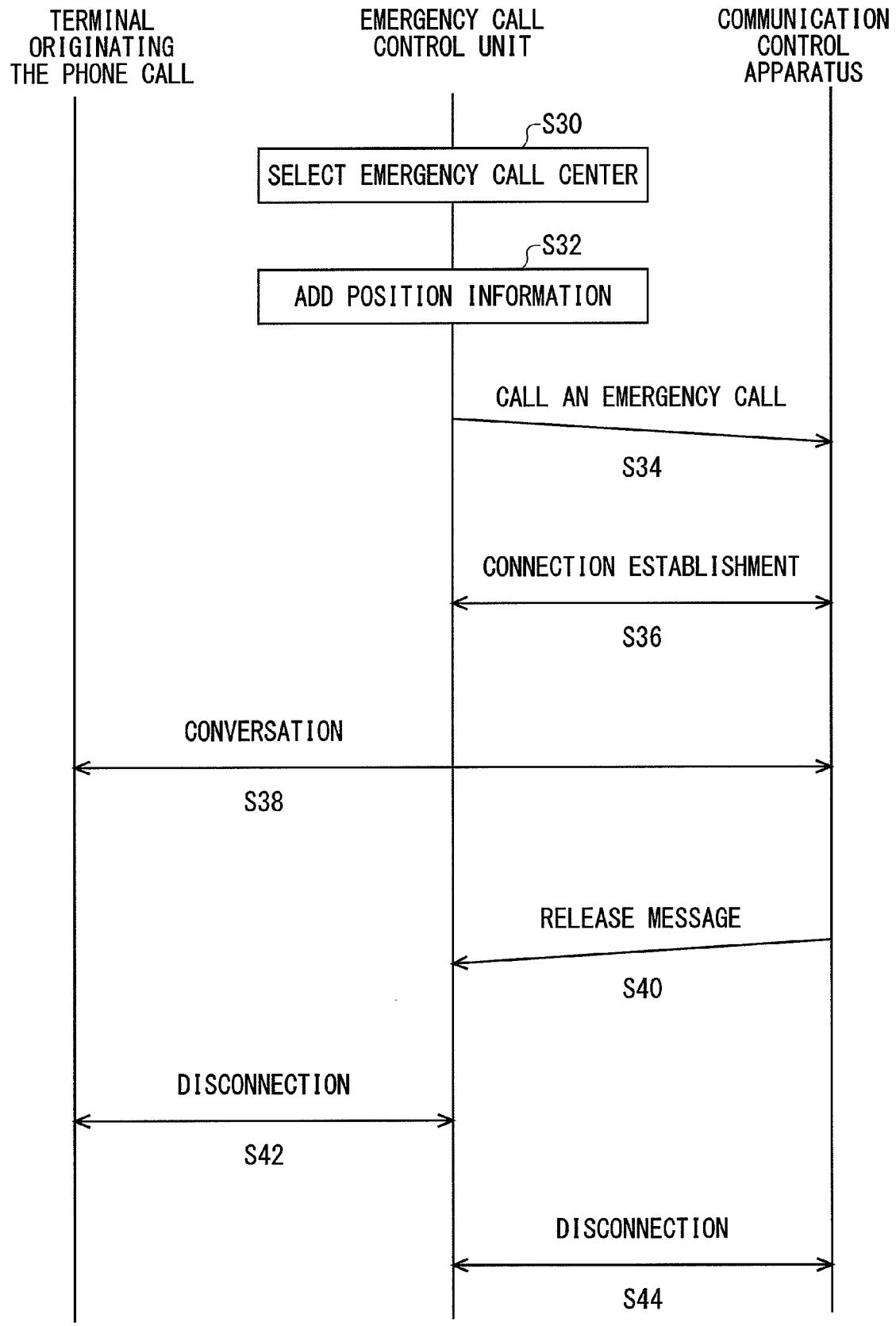

COMMUNICATION CONTROL DEVICE AND COMMUNICATION CONTROL METHOD FOR AN EMERGENCY CALL OVER THE INTERNET

TECHNICAL FIELD

The present invention relates to a communication control technique, and particularly to a communication control apparatus and a communication control method for controlling communication in accordance with the party on the other end of the communication.

BACKGROUND ART

Due to improved Internet infrastructures and the widespread of communication terminals, such as cellular phone terminals, personal computers, and VoIP (Voice over Internet Protocol) phone sets, the number of Internet users is now exploding. Under such circumstances, security problems such as computer viruses, hacking and spam mails have become apparent, requiring appropriate techniques for communication control. Also, since improved communication environments have enormously increased communication traffic, there are required communication control apparatuses that enable high-speed processing of a large volume of data.

[Patent Document 1] Japanese Patent Application Laid-open No. 4-180425.

DISCLOSURE OF THE INVENTION

Problem to be Solved by the Invention

The market share of IP phones has been increasing in recent years. However, there remains a problem in that it is difficult to make emergency calls from IP phones properly. Accordingly, there is an urgent need to develop an environment in which emergency calls can be made from all kinds of telephones.

The present invention has been made in view of such a situation, and a general purpose thereof is to provide a technique for controlling communication appropriately in accordance with the party on the other end of the communication.

[Means for Solving the Problem]

One aspect of the present invention relates to a communication control apparatus. The communication control apparatus comprises: a database which stores identification information of a party on the other end of communication with whom communication should be controlled; a search circuit which acquires communication data for requesting a connection to a party on the other end of communication and searches the database for the identification information of the party on the other end of communication; and a control unit which, if the identification information of the party on the other end of communication is found in the database, establishes, in place of the party on the other end of communication, a connection with a terminal of the transmission source of the communication data and controls communication between the transmission source and the party on the other end of communication.

The control unit may confirm, before establishing a connection with the terminal of the transmission source, that communication with the terminal of the transmission source can be established normally, and, if there is no response from the terminal of the transmission source, the control unit may forbid the establishment of the connection.

The control unit may transmit a connection termination request to the terminal of the transmission source before establishing a connection with the terminal of the transmission source, and further transmit a connection request thereto so as to establish a connection with the terminal of the transmission source.

After establishing a connection with the terminal of the transmission source, the control unit may establish a connection with the terminal of the party on the other end of communication, so as to relay communication data transmitted between the transmission source and the party on the other end of communication.

The communication control apparatus may be configured with a hardware circuit such as a wired logic circuit or an FPGA.

Another aspect of the present invention relates to a communication control method. The communication control method comprises: acquiring communication data for requesting a connection to a party on the other end of communication and searching, for identification information of the party on the other end of communication, a database storing the identification information of a party on the other end of communication with whom communication should be controlled; and establishing, in place of the party on the other end of communication, a connection with a terminal of the transmission source of the communication data and controlling communication between the transmission source and the party on the other end of communication, if the identification information of the party on the other end of communication is found in the database.

Optional combinations of the aforementioned constituting elements, and implementations of the invention in the form of methods, apparatuses, systems, recording mediums and computer programs may also be practiced as additional modes of the present invention.

[Advantageous Effects]

The present invention provides a technique for controlling communication appropriately in accordance with the party on the other end of the communication.

BRIEF DESCRIPTION OF THE DRAWINGS

FIG. 14 is a diagram that shows still yet another example of internal data of the first database.

FIG. 15 is a diagram that shows an example of internal data of a second database.

FIG. 16 is a diagram that shows another example of internal data of the second database.

FIG. 23 is a sequential diagram that shows a procedure of a communication control method according to the embodiment.

FIG. 24 is a sequential diagram that shows another procedure of the communication control method according to the embodiment.

Figure 1:
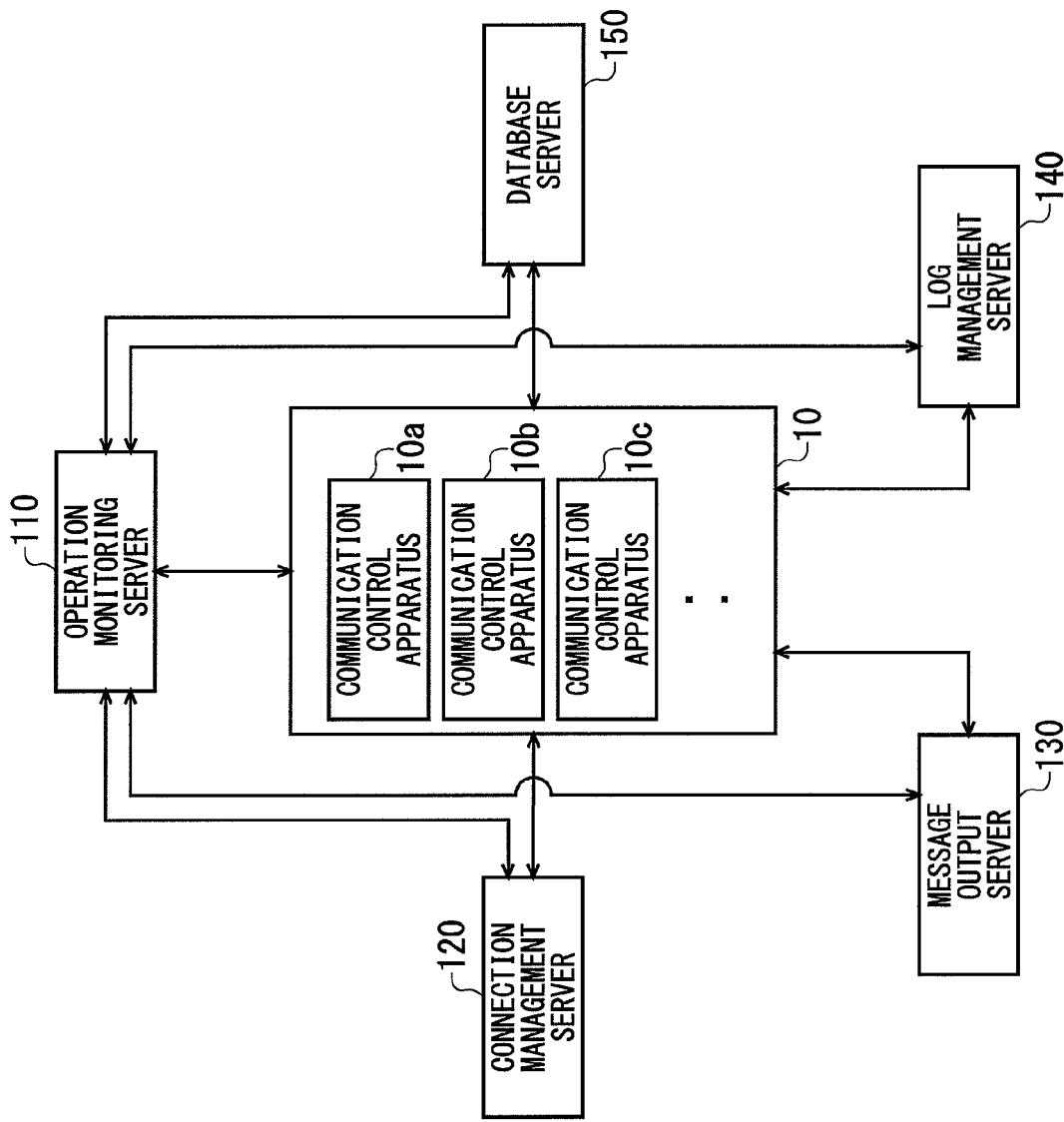
FIG. 1 is a diagram that shows a configuration of a communication control system according to a base technology.

EXPLANATION OF REFERENCE NUMERALS 10 communication control apparatus
20 packet processing circuit
30 search circuit
32 position detection circuit
33 comparison circuit
34 index circuit
35 comparison circuit
36 binary search circuit
36A, 36B and 36C comparison circuits
36Z control circuit
40 process execution circuit
50 first database
60 second database
100 communication control system
110 operation monitoring server
120 connection management server
130 message output server
131 emergency call control unit
132 position information retaining unit
140 log management server
150 database server
210 phone terminal
220 emergency call center
260 cellular phone terminal
262 base station apparatus
264 control station apparatus
280 IP phone terminal
282 router apparatus
284 router apparatus

BEST MODE FOR CARRYING OUT THE INVENTION

First, as a base technology, a communication control system that has no CPU or OS and performs a packet filtering function using a dedicated hardware circuit will be described. Thereafter, there will be described as an embodiment a communication control technique using the communication control system of the base technology.

(Base Technology)

FIG. 1 shows a configuration of a communication control system according to the base technology. A communication control system 100 comprises a communication control apparatus 10 and various peripheral apparatuses provided to support the operation of the communication control apparatus 10. The communication control apparatus 10 of the base technology performs a packet filtering function provided by an Internet service provider or the like. The communication control apparatus 10 provided on a network path acquires a packet transmitted via the network, analyzes the content, and determines whether or not the packet communication should be permitted. If the communication is permitted, the communication control apparatus 10 will transmit the packet to the network. If the communication is prohibited, the communication control apparatus 10 will discard the packet and return a warning message or the like to the transmission source of the packet if necessary.

The communication control system 100 of the base technology includes multiple communication control apparatuses 10a, 10b, 10c, etc. and operates them functioning as one communication control apparatus 10. Hereinafter, each of the communication control apparatuses 10a, 10b, 10c, etc. and their collective body will be both referred to as a communication control apparatus 10 with no distinction.

In the communication control system 100 of the base technology, each communication control apparatus 10 stores the respective shares of at least part of databases necessary for packet processing; there are provided as many as the number of communication control apparatuses 10 required to share and store such databases, and at least one more apparatus is provided extra. For example, when the number of pieces of data is 300,000 or above but less than 400,000, the number of communication control apparatuses required for operation is four. However, one or more communication control apparatuses 10 should be further provided as standby units in case any of the communication control apparatuses 10 in operation fails or in case a database in any of the communication control apparatuses 10 is updated. Accordingly, at least five communication control apparatuses 10 are provided in total. Conventionally, the entire system has needed to be duplexed considering fault tolerance. According to the technique of the base technology, in contrast, a divided unit of the communication control apparatus 10 may be only provided extra, thereby enabling cost reduction. The operating state of the multiple communication control apparatuses 10a, 10b, 10c, etc. is managed by an operation monitoring server 110. The operation monitoring server 110 of the base technology has a management table for managing the operating state of the communication control apparatuses.

The peripheral apparatuses include the operation monitoring server 110, a connection management server 120, a message output server 130, a log management server 140 and a database server 150. The connection management server 120 manages connection to the communication control apparatus 10. When the communication control apparatus 10 processes a packet transmitted from a cellular phone terminal, for example, the connection management server 120 authenticates the user as a user entitled to enjoy the service of the communication control system 100, based on information included in the packet, which uniquely identifies the cellular phone terminal. Once the user is authenticated, packets transmitted from the IP address, which is temporarily provided for the cellular phone terminal, will be transmitted to the communication control apparatus 10 and processed therein, without being authenticated by the connection management server 120 during a certain period. The message output server 130 outputs a message to the destination or the source of packet transmission, according to whether the communication control apparatus 10 has permitted the packet communication. The log management server 140 manages the operating history of the communication control apparatus 10. The database server 150 acquires the latest database from an external source and provides the database to the communication control apparatus 10. To update the database without halting the operation of the communication control apparatus 10, the apparatus may possess a backup database. The operation monitoring server 110 monitors the operating state of the communication control apparatus 10 and its peripheral apparatuses including the connection management server 120, message output server 130, log management server 140 and database server 150. The operation monitoring server 110 has the highest priority in the communication control system 100 and performs supervisory control of the communication control apparatus 10 and all the peripheral apparatuses. Although the communication control apparatus 10 is configured with a dedicated hardware circuit, as will be described later, the operation monitoring server 110 can monitor the operating state even while the communication control apparatus 10 is in operation, by inputting to or outputting from the communication control apparatus 10 the data for monitoring by means of a boundary-scan circuit based on the technique described in Japanese Patent No. 3041340 filed by the present applicant or other techniques.

In the communication control system 100 of the base technology, as will be described below, the communication control apparatus 10, configured with a dedicated hardware circuit for faster operation, is controlled by using a group of peripheral servers connected thereto and having various functions. Accordingly, by suitably replacing the software of the group of servers, a wide variety of functions can be achieved with a similar configuration. Thus, the base technology provides such communication control system having high flexibility.

Figure 2:
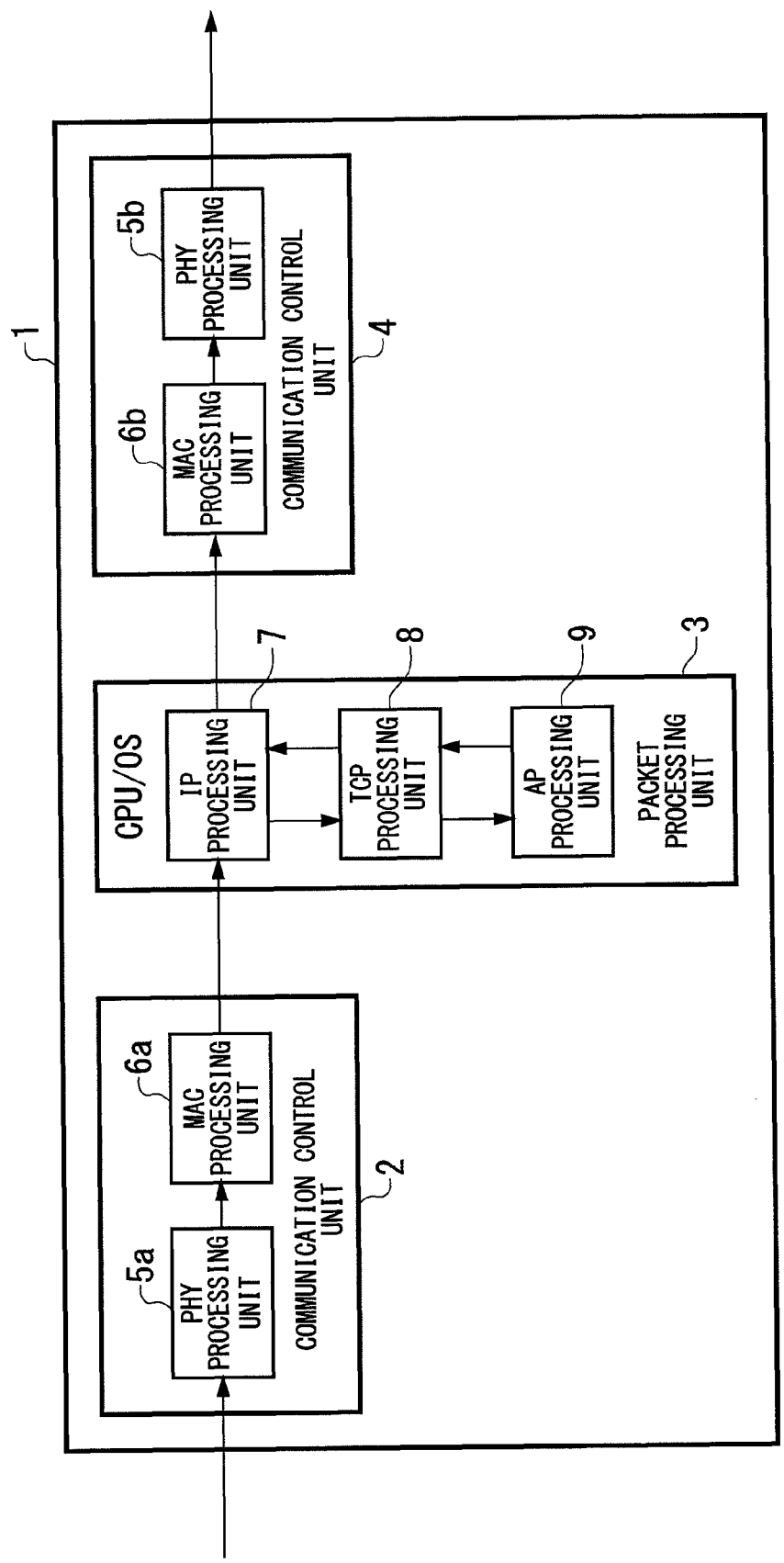
FIG. 2 is a diagram that shows a configuration of a conventional communication control apparatus.

FIG. 2 shows a configuration of a conventional communication control apparatus 1. The conventional communication control apparatus 1 comprises a communication control unit 2 on the receiving side, a packet processing unit 3, and a communication control unit 4 on the sending side. The communication control units 2 and 4 include PHY processing units 5a and 5b for performing physical layer processing of packets, and MAC processing units 6a and 6b for performing MAC layer processing of packets, respectively. The packet processing unit 3 includes protocol processing units for performing protocol-specific processing, such as an IP processing unit 7 for performing IP (Internet Protocol) processing and a TCP processing unit 8 for performing TCP (Transport Control Protocol) processing. The packet processing unit 3 also includes an AP processing unit 9 for performing application layer processing. The AP processing unit 9 performs filtering or other processing according to data included in a packet.

The packet processing unit 3 of the conventional communication control apparatus 1 is implemented by software, using a general-purpose processor, or CPU, and an OS running on the CPU. With such configuration, however, the performance of the communication control apparatus 1 depends on the performance of the CPU, hampering the creation of a communication control apparatus capable of high-speed processing of a large volume of packets. For example, a 64-bit CPU can process only up to 64 bits at a time, and hence, there has existed no communication control apparatus having a higher performance than this. In addition, since the conventional communication control apparatus is predicated on the presence of an OS with versatile functionality, the possibility of security holes cannot be eliminated completely, requiring maintenance work including OS upgrades.

Figure 3:
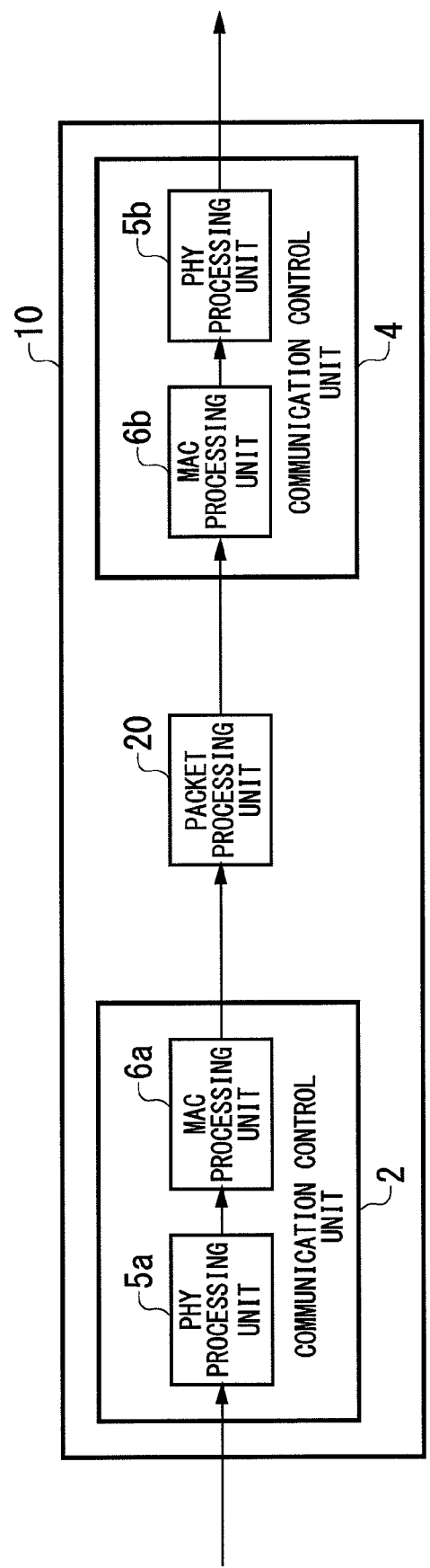
FIG. 3 is a diagram that shows a configuration of a communication control apparatus according to the base technology.

FIG. 3 shows a configuration of a communication control apparatus according to the base technology. A communication control apparatus 10 of the base technology comprises a packet processing circuit 20 configured with dedicated hardware employing a wired logic circuit, instead of a packet processing unit that is implemented by software including a CPU and an OS in a conventional communication control apparatus. By providing a dedicated hardware circuit to process communication data, rather than processing it with an OS and software running on a general-purpose processing circuit such as CPU, the performance limitations posed by the CPU or OS can be overcome, enabling a communication control apparatus having high throughput.

For example, a case will be considered here in which search is conducted in packet filtering or the like to check if the data in a packet includes reference data, which serves as criteria for filtering. When a CPU is used to compare the communication data with the reference data, there occurs a problem in that, since only 64-bit data can be compared at a time, the processing speed cannot be improved beyond such CPU performance. Since the CPU needs to repeat the process of loading 64 bits of communication data into a memory and comparing it with the reference data, the memory load time becomes a bottleneck that limits the processing speed.

In the base technology, by contrast, a dedicated hardware circuit configured with a wired logic circuit is provided to compare communication data with reference data. This circuit includes multiple comparators arranged in parallel, so as to enable the comparison of data having a length greater than 64 bits, such as 1024 bits. By providing dedicated hardware in such manner, bit matching can be simultaneously performed on a large number of bits in parallel. Since 1024-bit data can be processed at a time, while the conventional communication control apparatus 1 using a CPU processes only 64 bits, the processing speed can be improved remarkably. Increasing the number of comparators will improve the throughput, but also increase the cost and size of the apparatus. Accordingly, an optimal hardware circuit may be designed in accordance with the desired performance, cost or size.

Since the communication control apparatus 10 of the base technology is configured with dedicated hardware employing a wired logic circuit, it does not require any OS (Operating System). This can eliminate the need for the installation, bug fixes, or version upgrades of an OS, thereby reducing the cost and man-hours required for administration and maintenance. Also, unlike CPUs requiring versatile functionality, the communication control apparatus 10 does not include any unnecessary functions or use needless resources, and hence, reduced cost, a smaller circuit area or improved processing speed can be expected. Furthermore, again unlike conventional OS-based communication control apparatuses, the absence of unnecessary functions decreases the possibility of security holes and thus enhances the tolerance against attacks from malicious third parties over a network.

The conventional communication control apparatus 1 processes packets using software predicated on a CPU and an OS. Therefore, all packet data needs to be received before protocol processing is performed, and then the data is passed to an application. In contrast, since packet processing is performed by a dedicated hardware circuit in the communication control apparatus 10 of the base technology, all packet data need not be received before starting the processing; upon reception of necessary data, the processing can be started at any given point in time without waiting for the reception of subsequent data. For example, position detection processing in a position detection circuit, which will be described later, may be started at the time when position identification data for identifying the position of comparison target data is received. Thus, various types of processing can be performed in parallel without waiting for the reception of all data, reducing the time required to process packet data.

Figure 4:
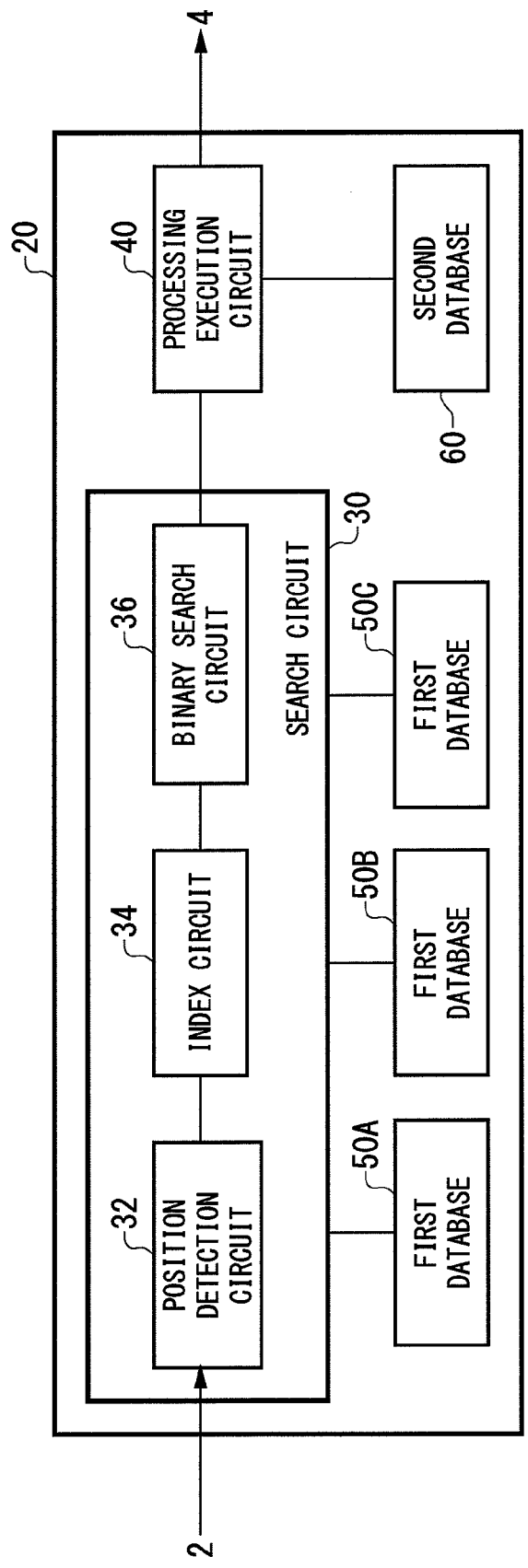
FIG. 4 is a diagram that shows a configuration of a packet processing circuit.

FIG. 4 shows an internal configuration of the packet processing circuit. The packet processing circuit 20 comprises: first databases 50A, 50B and 50C (hereinafter, they may be collectively referred to as "first databases 50") for storing reference data, which is referred to when processing to be performed on communication data is determined; a search circuit 30 for searching received communication data for the reference data by comparing the two; a second database 60 for storing a search result of the search circuit 30 and a content of processing to be performed on the communication data, which are related to each other; and a process execution circuit 40 for processing the communication data based on the search result of the search circuit 30 and the conditions stored in the second database 60.

The search circuit 30 includes: a position detection circuit 32 for detecting the position of comparison target data, which is to be compared with reference data, in communication data; an index circuit 34 which serves as an example of a determination circuit that determines which range the comparison target data belongs to among three or more ranges, into which the reference data stored in the first database 50 is divided; and a binary search circuit 36 for searching the determined range for the reference data that matches the comparison target data. The reference data may be searched for the comparison target data using any search technique, and a binary search method is used in the base technology. Since an improved binary search method is employed, as will be discussed later, three first databases 50 are provided in the base technology. The first databases 50A, 50B and 50C store the same reference data.

Figure 5:
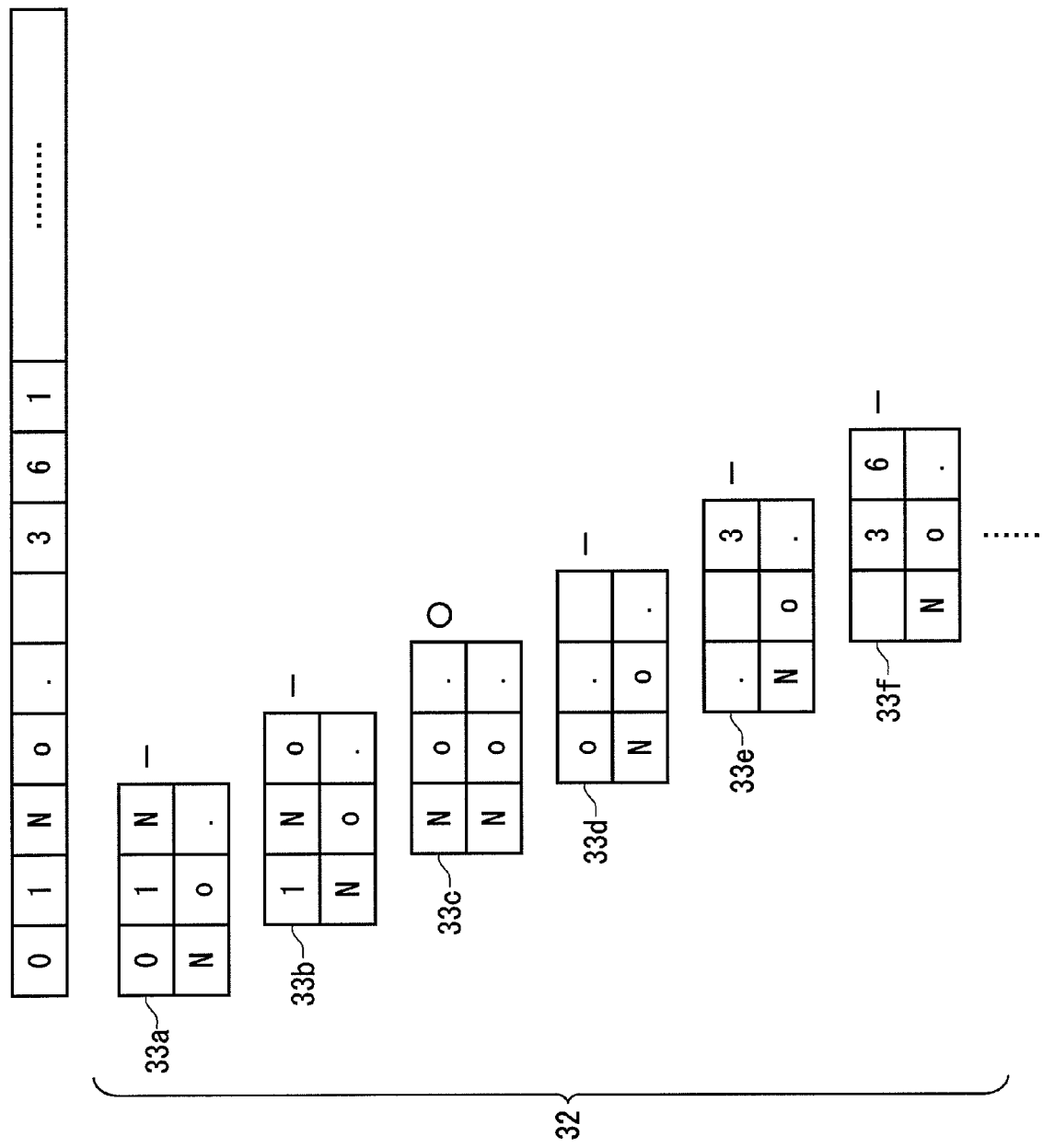
FIG. 5 is a diagram that shows a configuration of a position detection circuit.

FIG. 5 shows an internal configuration of the position detection circuit. The position detection circuit 32 includes multiple comparison circuits 33a-33f that compare communication data with position identification data for identifying the position of comparison target data. While six comparison circuits 33a-33f are provided here, the number of comparison circuits may be arbitrary, as will be described later. To the comparison circuits 33a-33f are input pieces of communication data, with each piece shifted from the preceding one by a predetermined data length, such as 1 byte. These multiple comparison circuits 33a-33f then simultaneously compare the respective communication data with the position identification data to be detected in parallel.

The base technology will be described by way of example for explaining the operation of the communication control apparatus 10, in which a character string "No. ###" in communication data is detected, the number "###" included in the character string is then compared with reference data, and if the number matches the reference data, the packet will be allowed to pass, while, if they do not match, the packet will be discarded.

In the example of FIG. 5, communication data "01No. 361 . . . " is input to the comparison circuits 33a-33f with a shift of one character each, and position identification data "No." for identifying the position of the number "###" is sought to be detected in the communication data. More specifically, "01N" is input to the comparison circuit 33a, "1No" to the comparison circuit 33b, "No." to the comparison circuit 33c, "o." to the comparison circuit 33d, "0.3" to the comparison circuit 33e, and "36" to the comparison circuit 33f. Then, the comparison circuits 33a-33f simultaneously perform comparisons with the position identification data "No.". Consequently, there is found a match with the comparison circuit 33c, indicating that the character string "No." exists at the third character from the top of the communication data. Thus, it is found that the numeral data as comparison target data exists subsequent to the position identification data "No." detected by the position detection circuit 32.

When the same processing is performed by a CPU, since the comparison process needs to be serially performed one by one from the top, such as comparing character strings "01N" and "No." before comparing "1No" and "No.", no improvement of detection speed can be expected. In the communication control apparatus 10 of the base technology, in contrast, providing the multiple comparison circuits 33a-33f in parallel enables simultaneous parallel comparison processing, which could not have been performed with a CPU, improving the processing speed significantly. Providing more comparison circuits will improve the detection speed, as more characters can be compared simultaneously. In consideration of cost or size, a sufficient number of comparison circuits may be provided to achieve a desired detection speed.

Aside from detecting position identification data, the position detection circuit 32 may also be used as a circuit for detecting character strings for various purposes. Moreover, the position detection circuit 32 may be configured to detect position identification data in units of bits, not just as a character string.

Figure 6:
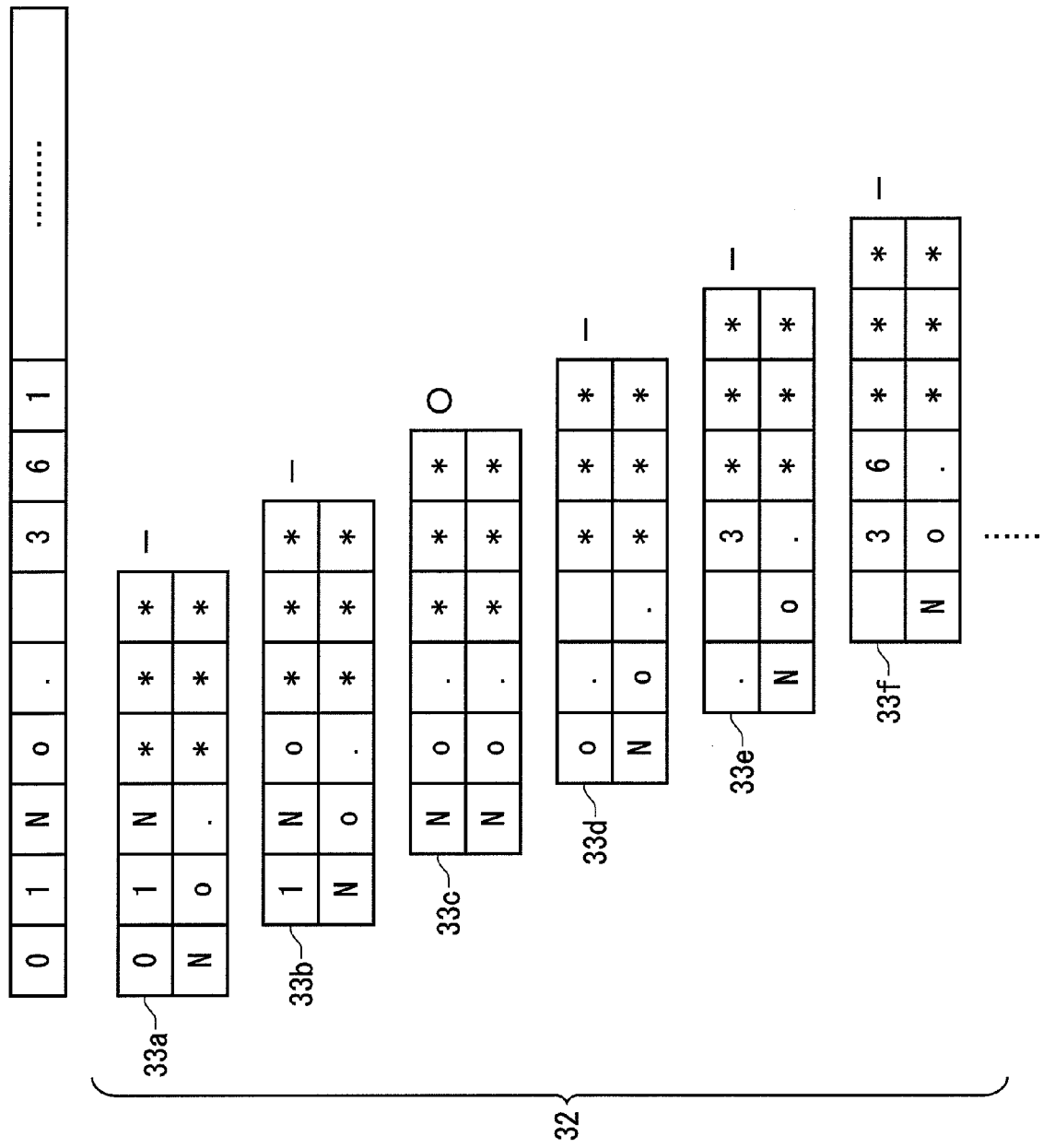
FIG. 6 is a diagram that shows another example of the position detection circuit.

FIG. 6 shows another example of the position detection circuit. In the example shown in FIG. 6, when the data length of position identification data is shorter than that prepared in each of the comparison circuits 33a-33f in the position detection circuit 32, predetermined data, such as "00H" or "01H", is padded posterior to the position identification data. Similarly, with regard to communication data to be compared with position identification data, a data length identical with that of the position identification data is extracted from the communication data and input to a comparison circuit, and the same data as padded after the position identification data is also padded posterior thereto. In such case, the communication data may be copied as work, and the copied data may be processed to be input to the comparison circuits 33a-33f, so as not to change the original communication data. Thus, the position detection circuit 32 can be generally used regardless of the length of position identification data.

Figure 7:
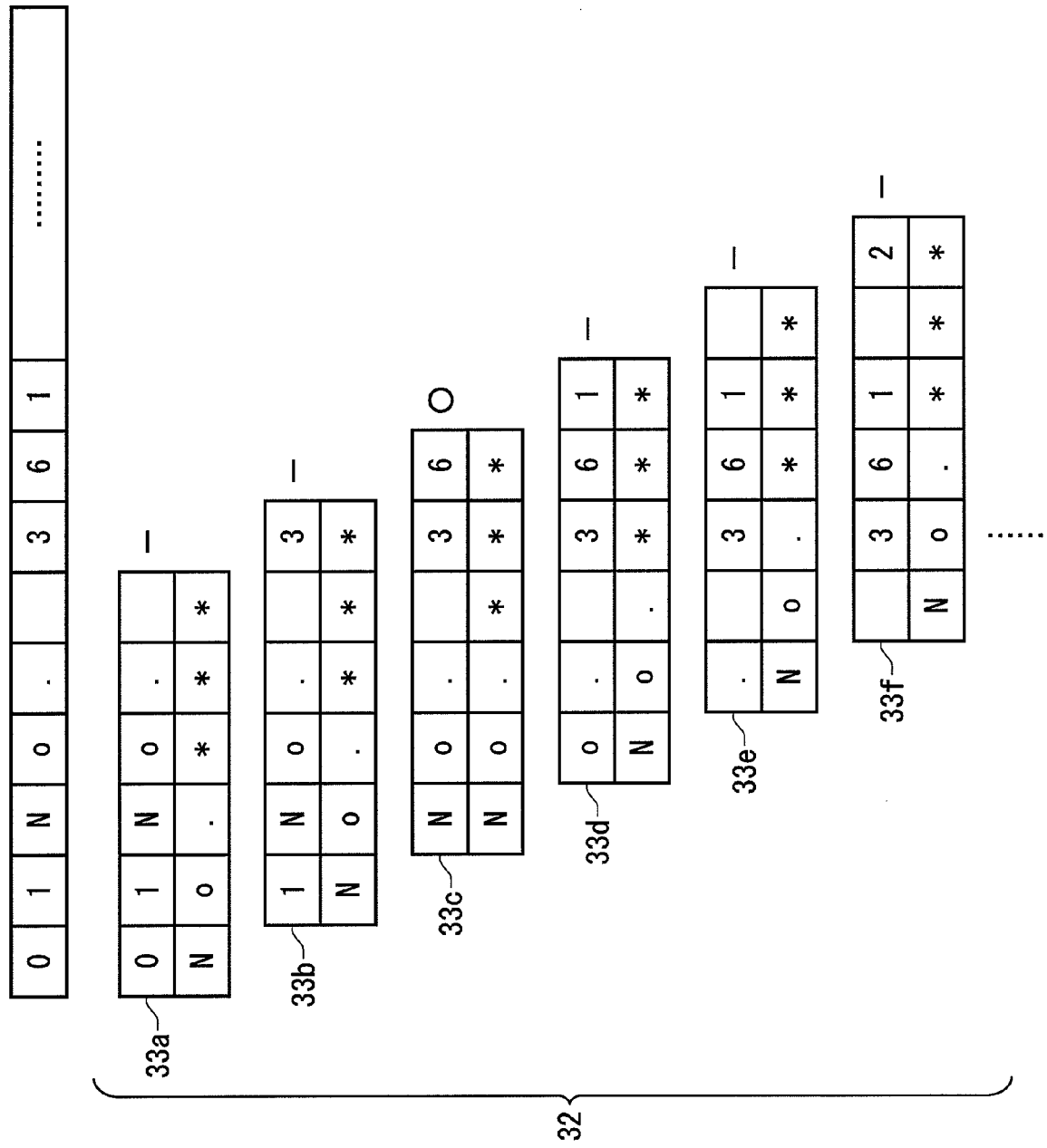
FIG. 7 is a diagram that shows yet another example of the position detection circuit.

FIG. 7 shows yet another example of the position detection circuit. In the example shown in FIG. 7, predetermined data is padded posterior to position identification data in the same way as shown in the example of FIG. 6, and, in addition, such data is regarded as a wild card. That is, when data is input as a wild card into the comparison circuits 33a-33f, it is determined that the corresponding part of target data to be compared matches the wild-card data whatever the target data is. Thus, the position detection circuit 32 can be generally used regardless of the length of position identification data.

Figure 8:
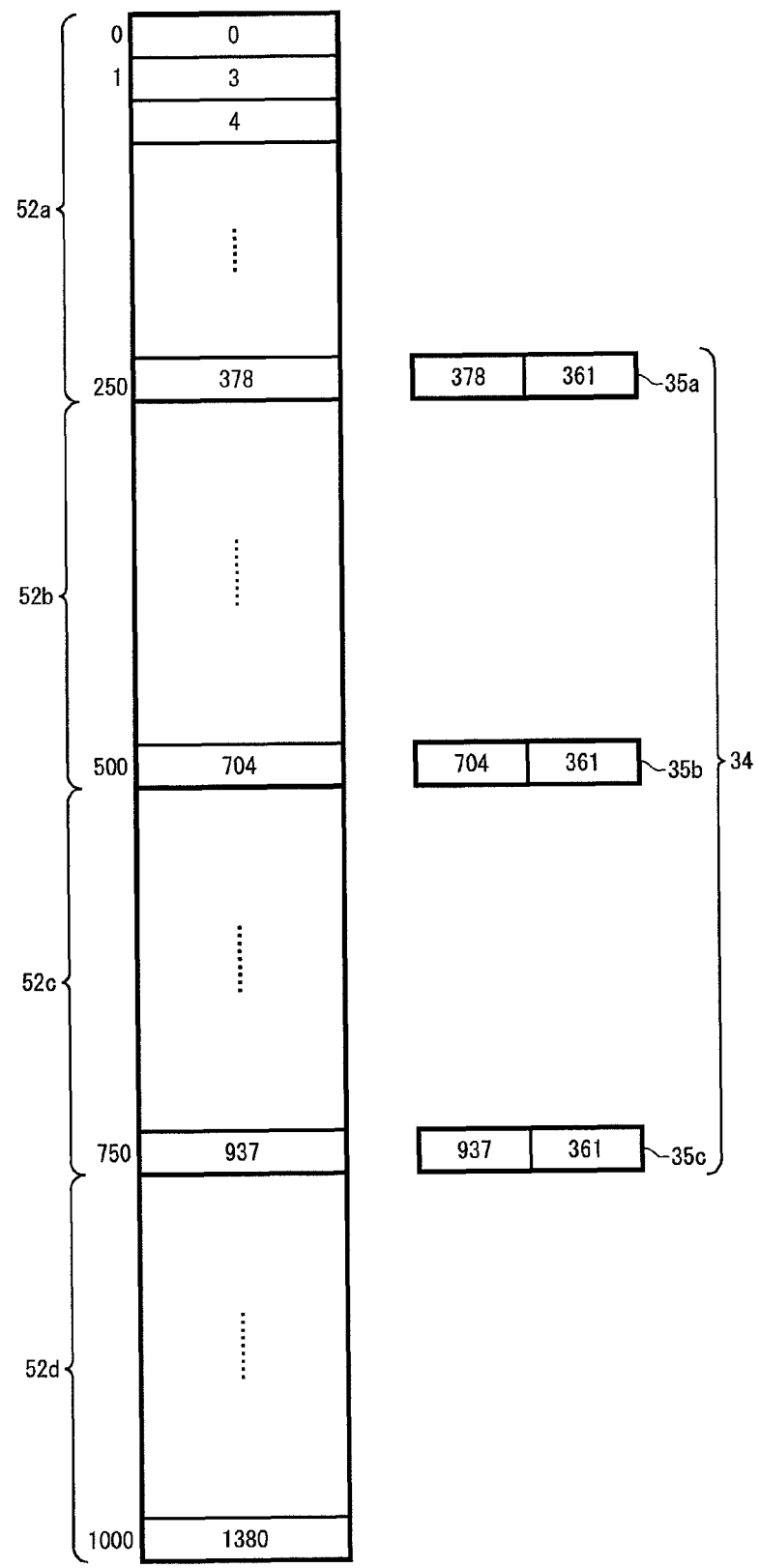
FIG. 8 is a diagram that shows an example of internal data of a first database.

FIG. 8 shows an example of internal data of the first database. The first database 50 stores reference data, which is referred to when processing on packets, such as filtering, routing, switching, or replacement, is determined. The pieces of reference data are sorted according to some sort conditions and stored in ascending or descending order. In the example of FIG. 8, 1000 pieces of reference data are stored.

The index circuit 34 determines which range comparison target data belongs to among three or more ranges, such as 52a-52d, into which reference data stored in the first database 50 is divided. In the example of FIG. 8, the 1000 pieces of reference data are divided into four ranges 52a-52d, i.e., 250 pieces each in a range. The index circuit 34 includes multiple comparison circuits 35a-35c, each of which compares a piece of reference data at the border of the range with the comparison target data. Since the comparison circuits 35a-35c simultaneously compare the pieces of reference data at the borders with the comparison target data in parallel, which range the comparison target data belongs to can be determined by a single operation of comparison processing.

The pieces of reference data at the borders to be input to the comparison circuits 35a-35c of the index circuit 34 may be set by an apparatus provided outside the communication control apparatus 10. Alternatively, reference data at predetermined positions in the first database 50 may be set in advance to be automatically input as such. In the latter case, even when the first database 50 is updated, the reference data at the predetermined positions in the first database 50 are automatically input to the comparison circuits 35a-35c. Therefore, the communication control processing can be performed immediately without initialization or the like.

As mentioned previously, CPU-based binary search cannot make multiple comparisons at the same time. In the communication control apparatus 10 of the base technology, in contrast, providing the multiple comparison circuits 35a-35c in parallel enables simultaneous parallel comparison processing, with a significant improvement in the search speed.

After the index circuit 34 determines the relevant range, the binary search circuit 36 performs search using a binary search method. The binary search circuit 36 divides the range determined by the index circuit 34 further into $2^n$ and subsequently compares the pieces of reference data lying at the borders with the comparison target data, thereby determining which range the comparison target data belongs to. The binary search circuit 36 includes multiple comparators for comparing, bit by bit, reference data with comparison target data. For example, in the base technology are provided 1024 comparators to perform bit matching on 1024 bits simultaneously. When the range to which the comparison target data belongs is determined among the $2^n$ split ranges, the determined range is further divided into $2^n$. Then, the pieces of reference data lying at the borders are read out to be compared with the comparison target data. Thereafter, this processing is repeated to narrow the range further until reference data that matches the comparison target data is eventually found.

The operation will now be described in more detail in conjunction with the foregoing example. Each of the comparison circuits 35a-35c of the index circuit 34 receives "361" as comparison target data. As for reference data, the comparison circuit 35a receives "378", which lies at the border of the ranges 52a and 52b. Similarly, the comparison circuit 35b receives reference data "704" lying at the border of the ranges 52b and 52c, and the comparison circuit 35c receives reference data "937" lying at the border of the ranges 52c and 52d. The comparison circuits 35a-35c then perform comparisons simultaneously, determining that the comparison target data "361" belongs to the range 52a. Subsequently, the binary search circuit 36 searches the reference data for the comparison target data "361".

Figure 9:
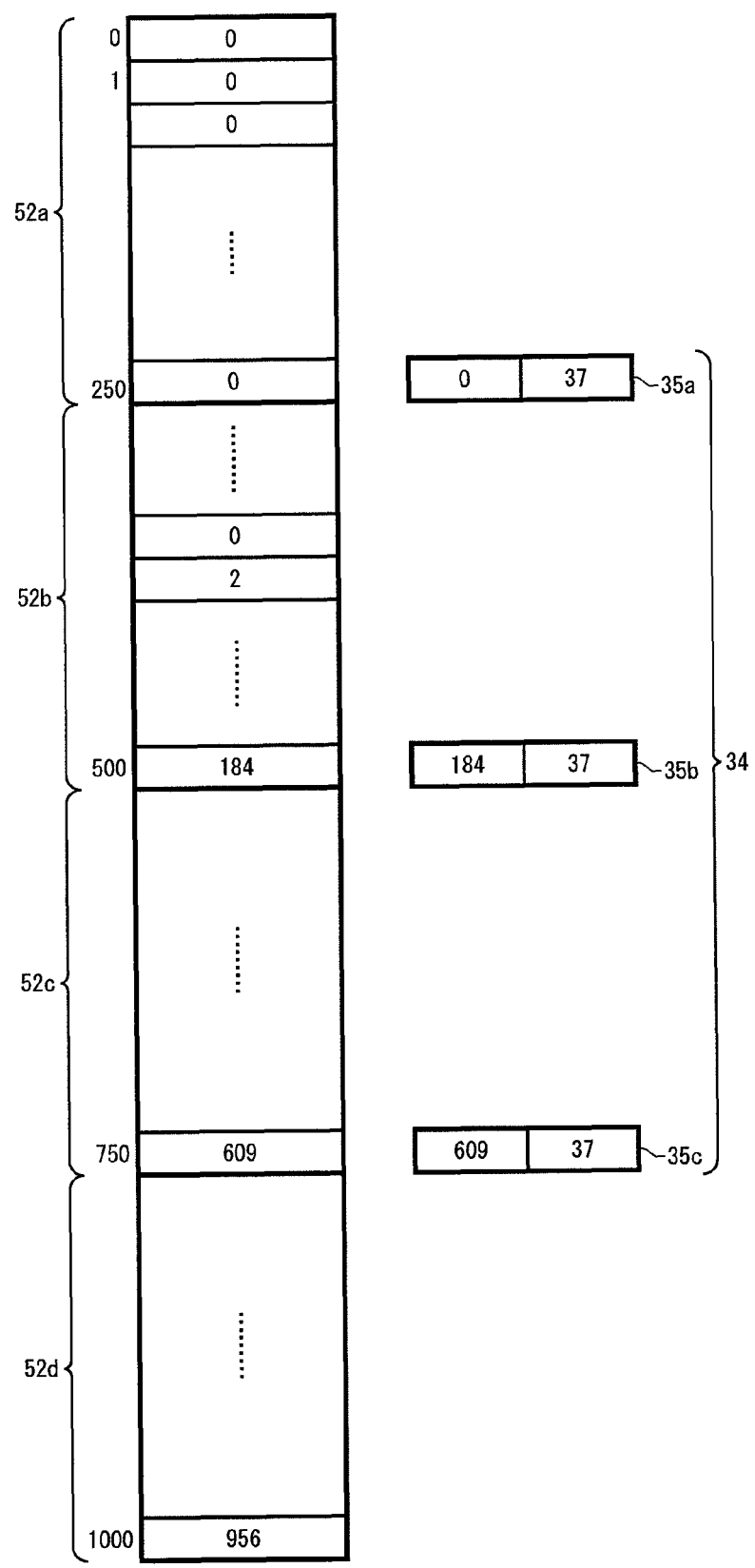
FIG. 9 is a diagram that shows another example of internal data of the first database.

FIG. 9 shows another example of internal data of the first database. In the example shown in FIG. 9, the number of pieces of reference data is smaller than the number of pieces of data storable in the first database 50, i.e., 1000 in this case. In such instance, the first database 50 stores the pieces of reference data in descending order, starting with the last data position therein. Then, 0 is stored in the rest of the data positions. The database is loaded with data not from the top but from the bottom of the loading area, and all the vacancies occurring in the front of the loading area, if any, are replaced with zero. Consequently, the database is fully loaded at any time, so that the search time necessary for binary search will be constant. Moreover, if the binary search circuit 36 reads reference data "0" during a search, the circuit can identify the range without making a comparison, as the comparison result is obvious, and can proceed to the next comparison. Consequently, the search speed can be improved.

In CPU-based software processing, the first database 50 stores pieces of reference data in ascending order, from the first data position therein. In the rest of data positions will be stored a maximum value or the like, and in such case, the skip of comparison processing as described above cannot be made during binary search. The comparison technique described above can be implemented by configuring the search circuit 30 with a dedicated hardware circuit.

Figure 10:
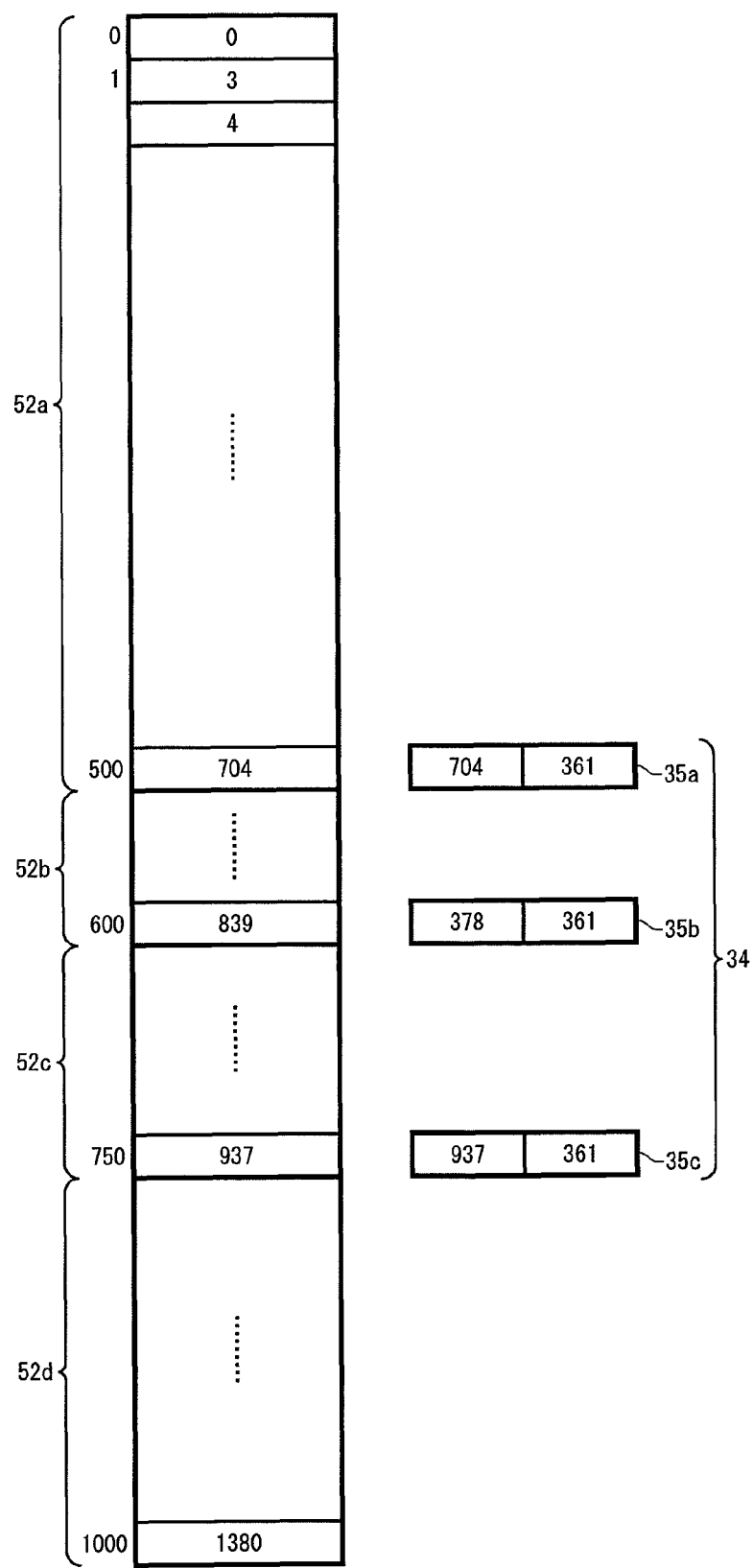
FIG. 10 is a diagram that shows yet another example of internal data of the first database.

FIG. 10 shows yet another example of internal data of the first database. In the example shown in FIG. 10, the reference data is not evenly divided into three or more ranges, but unevenly divided into ranges that accommodate different numbers of pieces of data, such as 500 pieces in the range 52a and 100 pieces in the range 52b. These ranges may be determined depending on the distribution of frequencies with which reference data occurs in communication data. Specifically, the ranges may be determined so that the sums of the frequencies of occurrence of reference data belonging to the respective ranges are almost the same. Accordingly, the search efficiency can be improved. The reference data to be input to the comparison circuits 35a-35c of the index circuit 34 may be modifiable from the outside. In such case, the ranges can be dynamically set, so that the search efficiency will be optimized.

Figure 11:
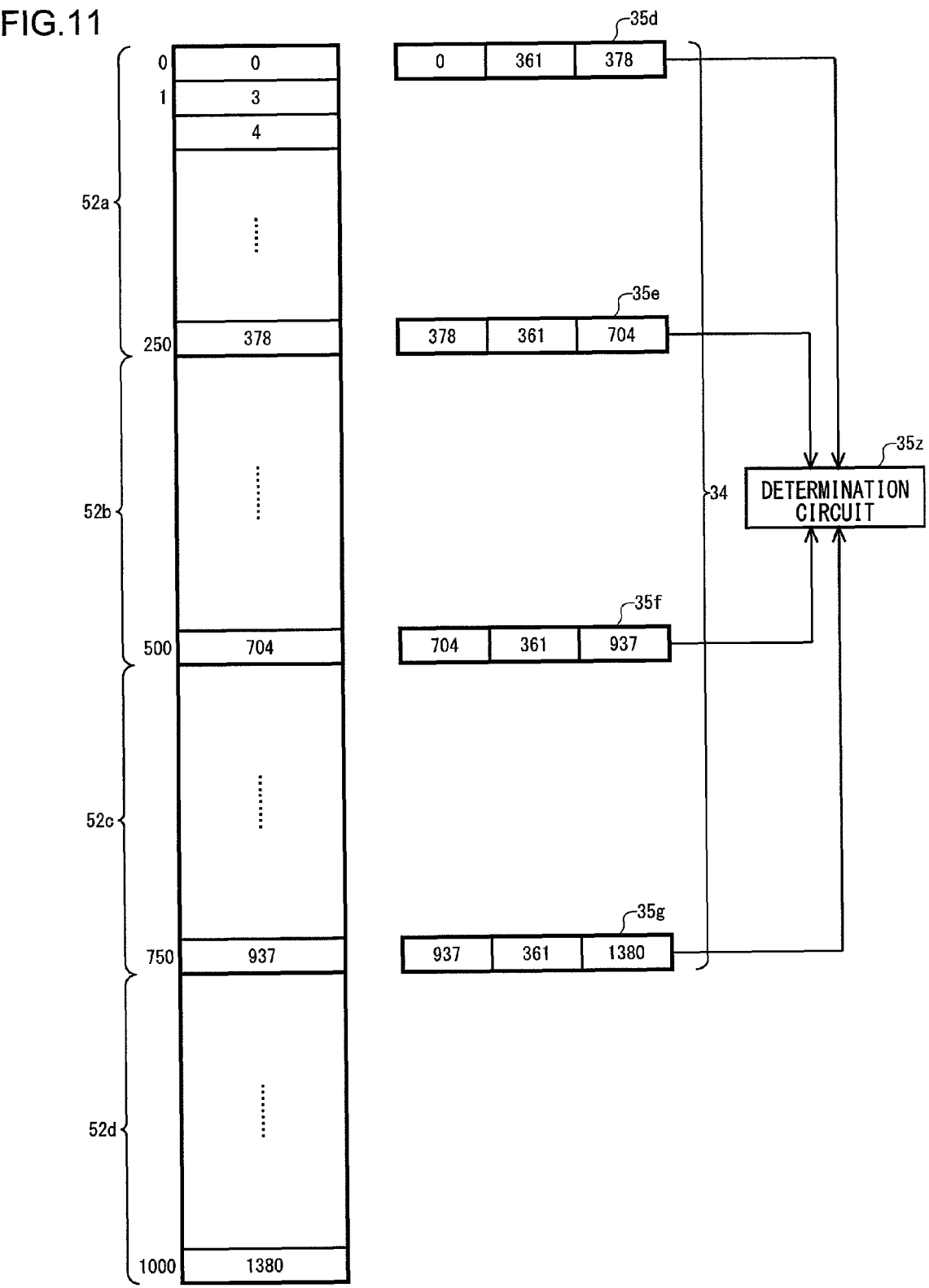
FIG. 11 is a diagram that shows another example of the index circuit.

FIG. 11 shows another example of the index circuit. In the examples of FIGS. 8-10, the index circuit 34 uses the three comparison circuits 35a-35c to determine which range comparison target data belongs to among the four ranges of 52a-52d in the first database 50. In the example shown in FIG. 11, on the other hand, the index circuit 34 is provided with four comparison circuits 35d-35g for determining whether or not comparison target data is included in each of the four ranges 52a-52d. For example, into the comparison circuit 35d are input the 0th and 250th pieces of reference data in the first database 50 and comparison target data. Then, each piece of the reference data is compared to the comparison target data, so as to determine whether or not the reference data is included in the range 52a. The comparison results provided by the comparison circuits 35d-35g are input into a determination circuit 35z, which outputs information providing which range the reference data is included in. Each of the comparison circuits 35d-35g may output a result indicating whether the reference data is included between the two input pieces of reference data, or may output a result indicating that the reference data is greater than the range, the reference data is included in the range, or the reference data is smaller than the range. When it is determined that the comparison target data is not included in any of the ranges 52a-52d, it can be found that the comparison target data does not exist within the first database 50. Accordingly, the search can be terminated without performing any further binary search.

Figure 12:
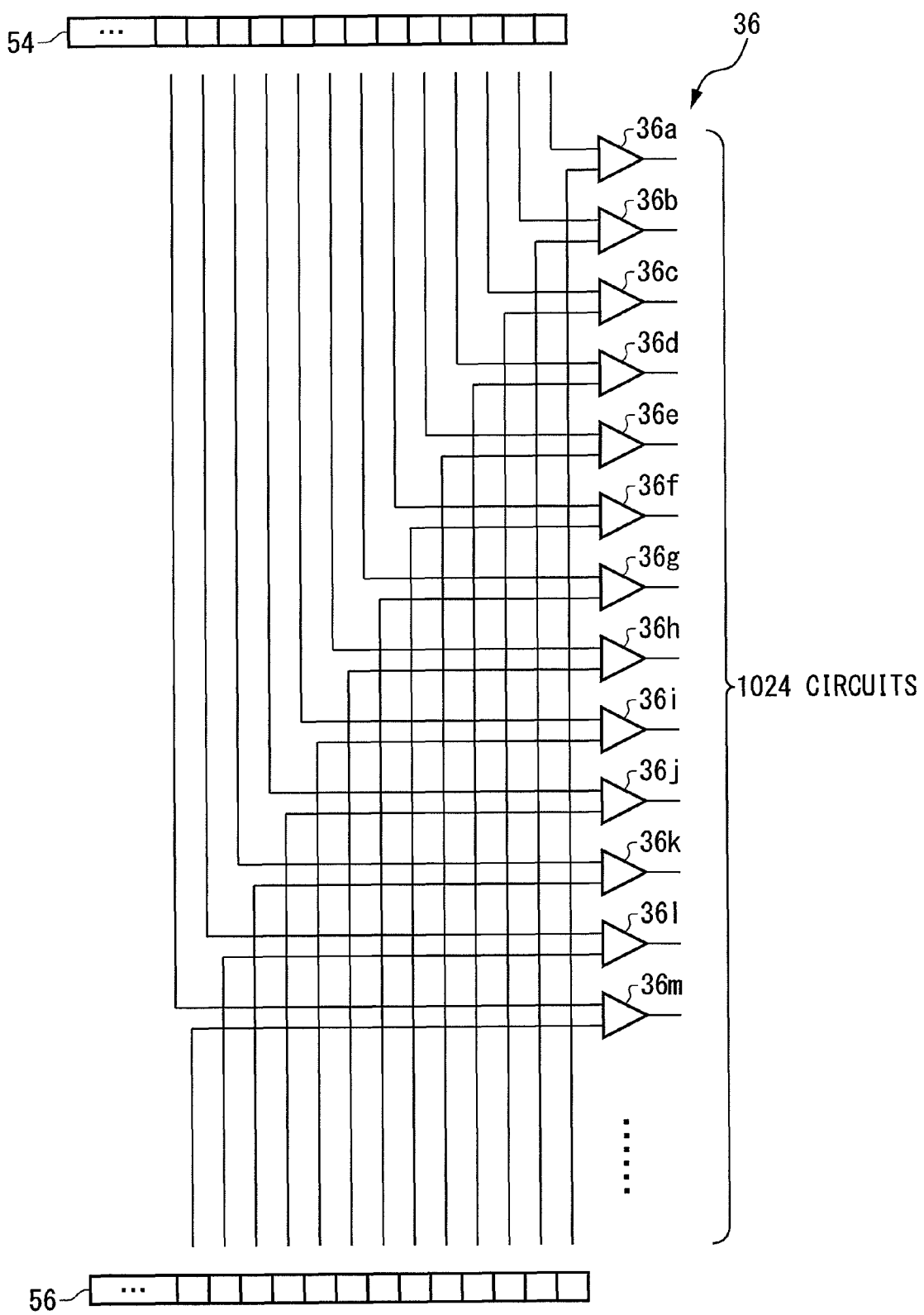
FIG. 12 is a diagram that shows a configuration of a comparison circuit included in a binary search circuit.

FIG. 12 shows a configuration of comparison circuits included in the binary search circuit. As mentioned previously, the comparison circuit in the binary search circuit 36 includes 1024 comparators, such as 36a, 36b, . . . . Each of the comparators 36a, 36b, etc. receives 1 bit of reference data 54 and 1 bit of comparison target data 56 to compare the bits in value. The comparison circuits 35a-35c of the index circuit 34 have similar internal configurations. Since the comparison processing is thus performed by a dedicated hardware circuit, a large number of comparison circuits can be operated in parallel to compare a large number of bits at a time, thereby speeding up the comparison processing.

Figure 13:
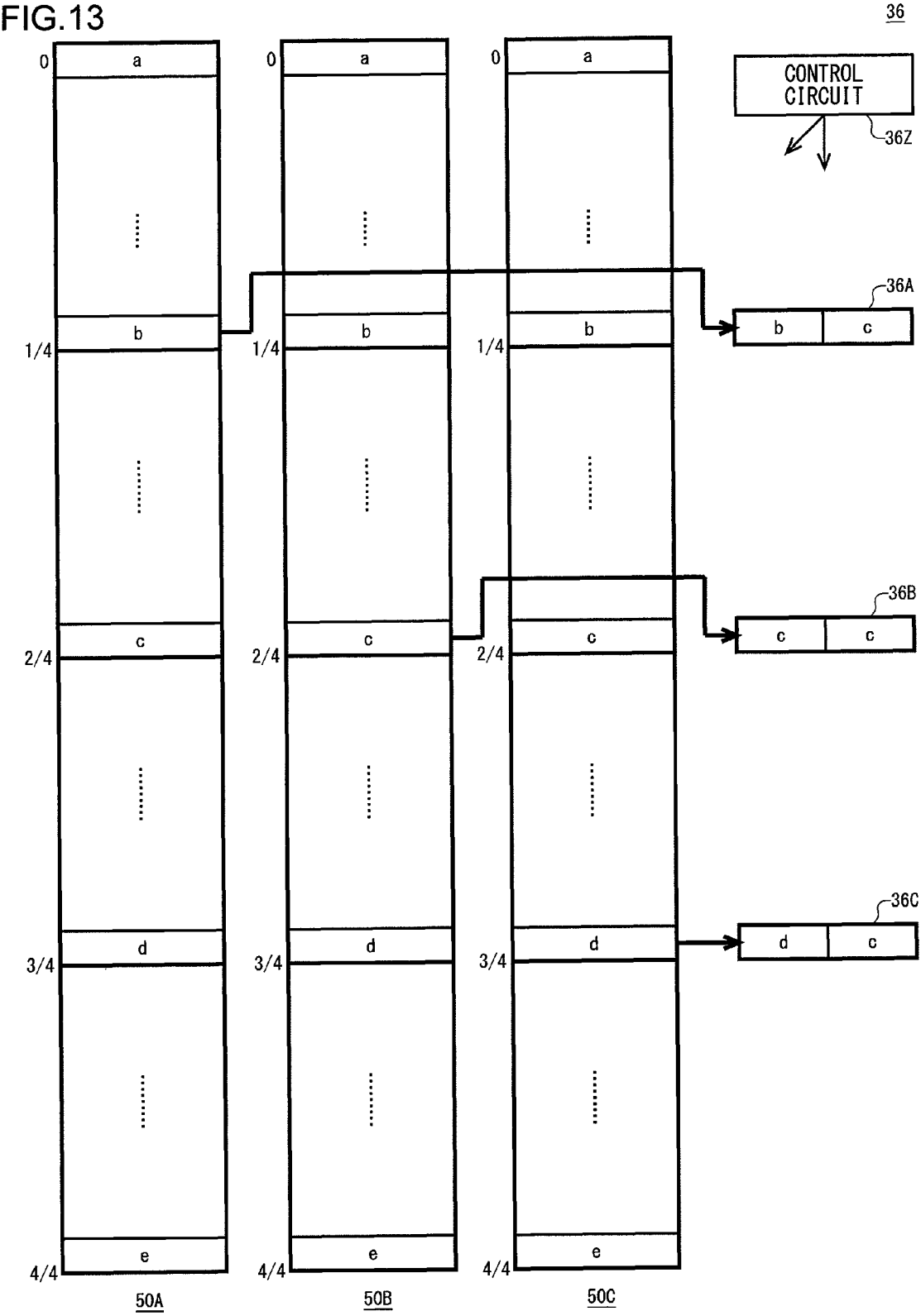
FIG. 13 is a diagram that shows a configuration of the binary search circuit.

FIG. 13 shows a configuration of the binary search circuit. The binary search circuit 36 includes comparison circuits 36A, 36B and 36C, each of which includes the 1024 comparators 36a, 36b, etc. as shown in FIG. 12, and a control circuit 36Z for controlling the comparison circuits.

In a conventional binary search method, a piece of data lying at the one-half position in the search range of a database, in which pieces of data are aligned in ascending or descending order, is read out to be compared with comparison target data in the first search. When the pieces of data are aligned in ascending order and if the comparison target data is smaller than the read out data, it means that the comparison target data might exist within the first half of the search range. Accordingly, in the second search, the search range is newly set to the first half and a piece of data lying at the one-half position in the range, i.e. at the one-quarter position in the original search range, is read out to be compared with the comparison target data. Conversely, if the comparison target data is greater than the read out data, it means that the comparison target data might exist within the second half of the search range. Accordingly, the new search range is set to the second half and a piece of data lying at the one-half position in the range, i.e. at the three-quarter position in the original search range, is read out to be compared with the comparison target data in the second search. In this way, the search range is narrowed by half repeatedly until the target data is reached.

In the base technology, in contrast, three comparison circuits are provided for binary search, so that when the data at the one-half position in the search range is compared with comparison target data for the first search, the comparison for the second search between the comparison target data and each of the pieces of data at the one-quarter and three-quarter positions in the search range can be simultaneously performed in parallel. Thus, the first and second searches can be performed at the same time, thereby reducing the time required to load the data from the database. Also, by operating three comparison circuits in parallel, the number of comparisons can be reduced by half, thereby reducing the search time.

In the example of FIG. 13, three comparison circuits are provided to perform two searches simultaneously. When n searches are to be performed simultaneously, $2^n-1$ comparison circuits may be generally provided. The control circuit 36Z inputs each piece of data at the $1/2^n, 2/2^n, \ldots$, and $(2^n-1)/2^n$ positions in the search range into the $2^n-1$ comparison circuits respectively, and operates the comparison circuits simultaneously in parallel to allow them to compare the respective pieces of data with comparison target data. The control circuit 36Z then acquires the comparison results from the comparison circuits and determines if the comparison target data is found. If any of the comparison circuits output a signal indicating that there has been a data match, the control circuit 36Z will determine that the comparison target data has been found and will terminate the binary search. If there is no such signal output, the process will be shifted to the next search. If the comparison target data exists within the database, the data must lie within a range between points where the comparison results of the $2^n-1$ comparison circuits change. In the case where 15 comparison circuits are provided, for example, if the piece of data at the 5/16 position is smaller than comparison target data and if the piece of data at the 6/16 position is greater than the comparison target data, the comparison target data should lie within the range between the 5/16 and 6/16 positions. Thus, the control circuit 36Z acquires comparison results from the comparison circuits and sets the next search range to a range between points where the comparison results change. The control circuit 36Z then inputs, into the respective comparison circuits, each piece of data at the $1/2^n, 2/2^n, \ldots$, and $(2^n-1)/2^n$ positions in the next search range thus set.

There are provided the three first databases 50 in the base technology; the first database 50A is connected to the comparison circuit 36A and supplies thereto a piece of data at the one-quarter position in the search range; the second database 50B is connected to the comparison circuit 36B and supplies thereto a piece of data at the two-quarter position in the search range; and the first database 50C is connected to the comparison circuit 36C and supplies thereto a piece of data at the three-quarter position in the search range. Therefore, pieces of data can be loaded simultaneously into the comparison circuits in parallel, thereby further reducing the time for data loading and enabling high-speed binary search.

Providing more comparison circuits will improve the search speed. In consideration of cost or size of the system, a sufficient number of comparison circuits may be provided to achieve a desired search speed. Also, although it is desirable that first databases as many as comparison circuits are provided, some comparison circuits may share a database in consideration of cost or size of the system.

FIG. 14 shows still yet another example of internal data of the first database. The first database 50 shown in FIG. 14 stores URLs of contents to which filtering is applied. The data stored in the first database 50 may include predetermined data recognized as a wild card, such as "00H" or "01H". In the example shown in FIG. 14, "*******" is recognized as a wild card in "http://www.xx.xx/*******", and, whatever the comparison target data corresponding thereto is, it is determined in the comparators 36a, 36b, etc. that such data matches the wild card. Accordingly, every character string starting with "http://www.xx.xx/" is detected by the binary search circuit 36. Consequently, processing such as applying filtering to all contents within the domain "http://www.xx.xx/" can be easily performed.

FIG. 15 shows an example of internal data of the second database. The second database 60 includes a search result field 62, which contains a search result of the search circuit 30, and a processing content field 64, which contains a processing content to be performed on communication data. The database stores the search results and the processing contents related to each other. In the example of FIG. 15, conditions are established such that a packet will be allowed to pass if its communication data contains reference data; if not, the packet will be discarded. The process execution circuit 40 searches the second database 60 for a processing content based on the search result and performs the processing on the communication data. The process execution circuit 40 may also be configured with a wired logic circuit.

FIG. 16 shows another example of internal data of the second database. In the example of FIG. 16, the processing content is set for each piece of reference data. With regard to packet replacement, replacement data may be stored in the second database 60. As for packet routing or switching, information on the route may be stored in the second database 60. The process execution circuit 40 performs processing, such as filtering, routing, switching, or replacement, which is specified in the second database 60, in accordance with the search result of the search circuit 30. When the processing content is set for each piece of reference data, as shown in FIG. 16, the first database 50 and the second database 60 may be merged with each other.

The first database and the second database are configured to be rewritable from the outside. By replacing these databases, various types of data processing and communication control can be achieved using the same communication control apparatus 10. Also, multistage search processing may be performed by providing two or more databases that store reference data to be searched. In such instance, more complicated conditional branching may be performed by providing two or more databases that store search results and processing contents related to each other. When multiple databases are thus provided to conduct multistage search, a plurality of the position detection circuits 32, the index circuits 34, the binary search circuits 36, etc. may also be provided.

The data intended for the foregoing comparison may be compressed by the same compression logic. If both the source data and the target data to be compared are compressed by the same method, the comparison can be performed in the same manner as usual, thus reducing the amount of data to be loaded for comparison. The smaller amount of data to be loaded can reduce the time required to read out the data from the memory, thereby reducing the overall processing time. Moreover, the number of comparators can be also reduced, which contributes to the miniaturization, weight saving, and cost reduction of the apparatus. The data intended for comparison may be stored in a compressed form, or may be read out from the memory and compressed before comparison.

Figure 17:
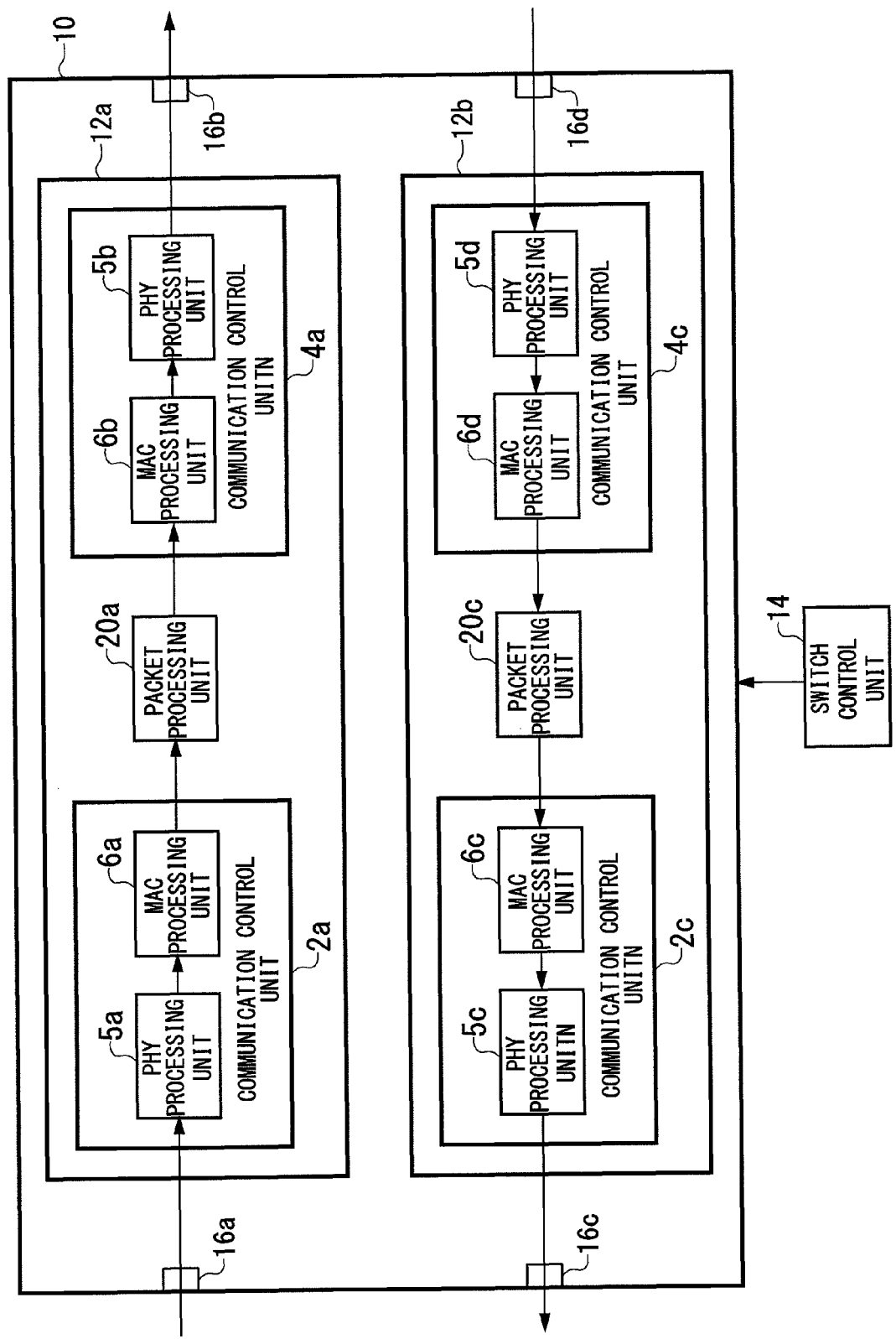
FIG. 17 is a diagram that shows another illustrative configuration of the communication control apparatus according to the base technology.

FIG. 17 shows another illustrative configuration of the communication control apparatus in the base technology. The communication control apparatus 10 shown in this diagram has two communication control units 12, each of which has the same configuration as the communication control apparatus 10 shown in FIG. 4. There is also provided a switch control unit 14 for controlling the operation of the individual communication control units 12. Each of the communication control units 12 has two input/output interfaces 16 and is connected to two networks, upstream and downstream, via the respective input/output interfaces 16. The communication control units 12 receive communication data from either one of the networks and output processed data to the other. The switch control unit 14 switches the inputs and outputs of the input/output interfaces 16 provided for the individual communication control units 12, thereby switching the directions of the flow of communication data in the communication control units 12. This allows communication control not only in one direction but also in both directions.

The switch control unit 14 may provide control such that: either one of the communication control units 12 processes inbound packets and the other processes outbound packets; both the units process inbound packets; or both the units process outbound packets. Consequently, the directions of communications to control can be changed depending on, for example, the traffic status or intended purpose.

The switch control unit 14 may acquire the operating state of the respective communication control units 12 and may switch the direction of communication control according thereto. For example, when one of the communication control units 12 is in a standby state and the other communication control unit 12 is in operation, the unit on standby may be activated as a substitute upon detection of the unit in operation stopping due to a failure or other reasons. This can improve the fault tolerance of the communication control apparatus 10. Also when one of the communication control units 12 needs maintenance such as a database update, the other communication control unit 12 may be operated as a substitute. Thus, appropriate maintenance can be performed without halting the operation of the communication control apparatus 10.

The communication control apparatus 10 may be provided with three or more communication control units 12. The switch control unit 14 may, for example, acquire the traffic status to control the direction of communications in the respective communication control units 12 so that more communication control units 12 are allocated for communication control processing in a direction handling higher traffic. This minimizes a drop in the communication speed, even when the traffic increases in one direction.

(Embodiment)

There will be described as an embodiment a technique for using the communication control system of the base technology to make an emergency call over a telephone network using the Internet or another network.

Although IP phones based on VoIP technology or the like have been put to practical use, it is unable to make emergency calls from IP phones under the present circumstances. It is because IP phones do not meet the following requirements for subscriber telephones usable for making emergency calls.

(1) Capable of connecting to an emergency call center the jurisdiction of which covers the position of the caller.

(2) Capable of preventing the caller from terminating the conversation and enabling the emergency call center to call the caller.

(3) Capable of notifying the emergency call center of the telephone number and position information of the caller.

The present embodiment proposes a technique for making an emergency call from an IP phone or a cellular phone that meets the requirements set forth above, using the communication control system 100 of the base technology.

The communication control system 100 of the present embodiment controls the conversation of an emergency call by allowing the search circuit 30 of the communication control apparatus 10 to detect communication data originating an emergency telephone number using the first database 50 that stores emergency telephone numbers. The communication control system 100 is provided on a communication path that connects a phone terminal originating an emergency call and an emergency call center. In the following, illustrative arrangements of the communication control system 100 will be cited.

Figure 18:
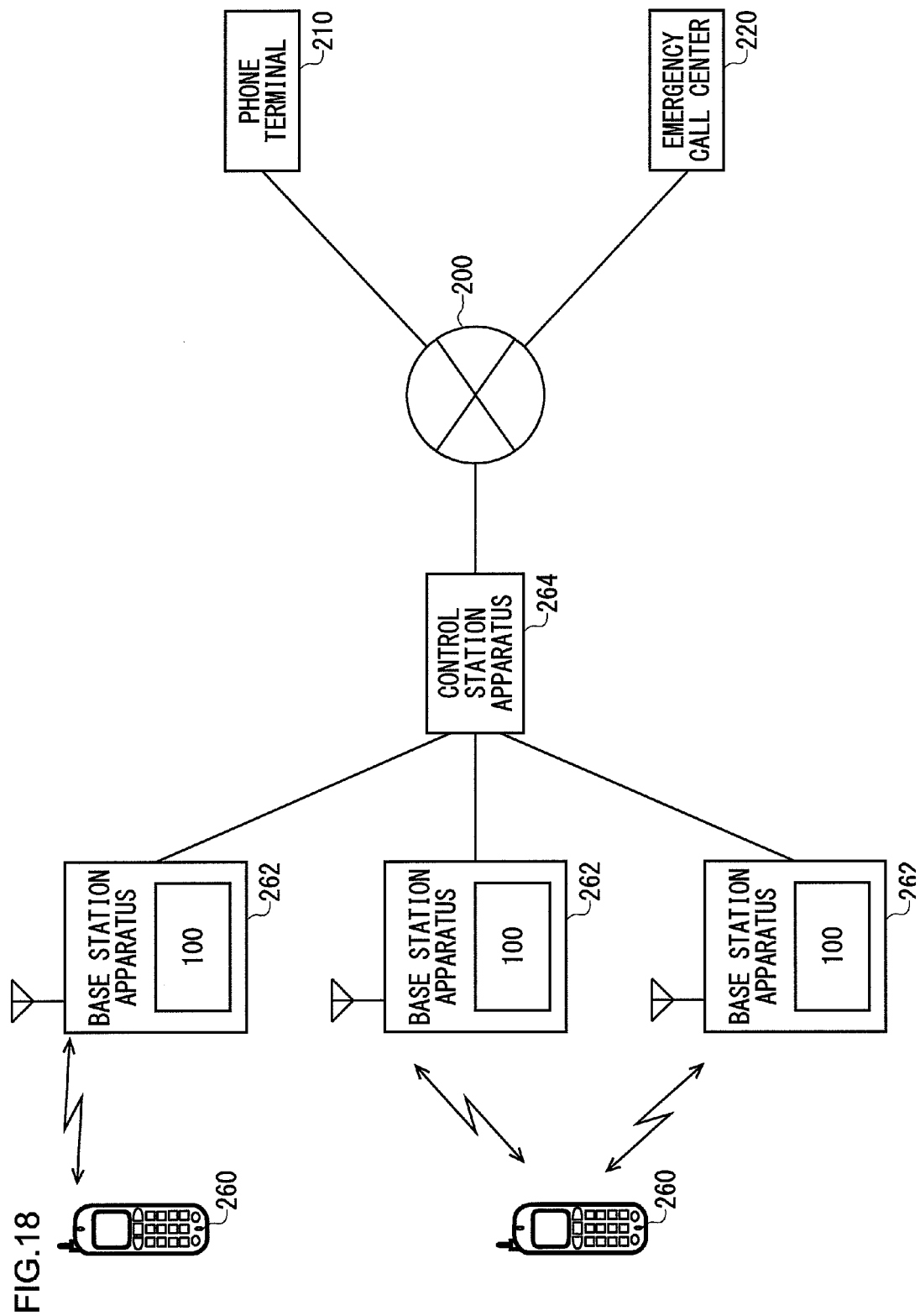
FIG. 18 is a diagram that shows an illustrative arrangement of a communication control system.

FIG. 18 shows an illustrative arrangement of the communication control system. This diagram shows an example in which cellular phone terminals 260 are used as phone terminals for originating phone calls. Communication data from a cellular phone terminal 260 is transmitted, via a base station apparatus 262 provided by a carrier and a control station apparatus 264 installed in a central office, to the Internet 200 and then reaches a phone terminal 210 of the call destination or an emergency call center 220. In the example of FIG. 18, the communication control systems 100 are provided in the base station apparatuses 262. In this case, the communication control systems 100 may be miniaturized by installing only minimum required functions therein. For example, a configuration corresponding to the connection management server 120 or log management server 140 may be excluded.

Figure 19:
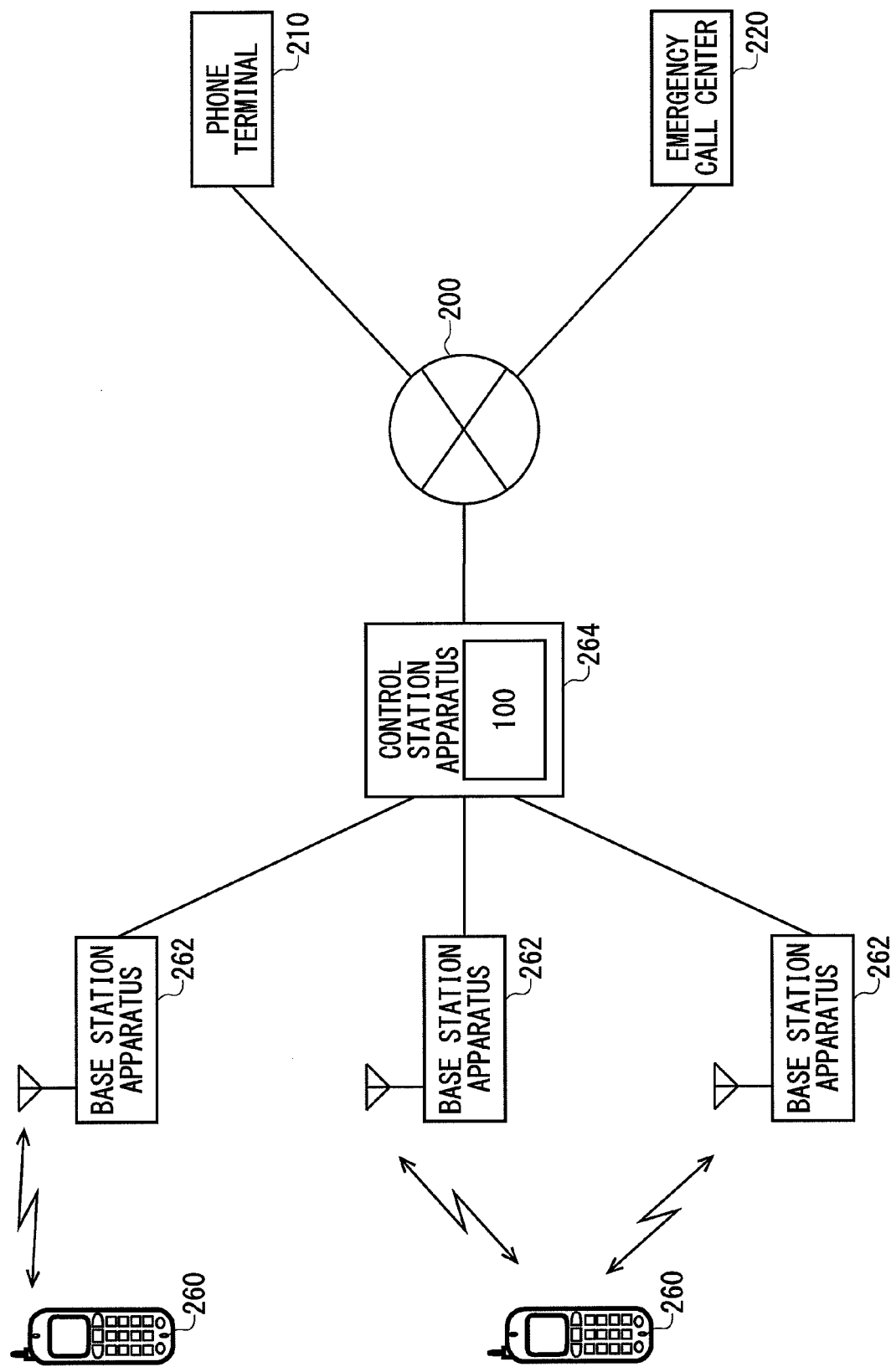
FIG. 19 is a diagram that shows another illustrative arrangement of the communication control system.

FIG. 19 shows another illustrative arrangement of the communication control system. This diagram also shows an example in which cellular phone terminals 260 are used but, unlike the example shown in FIG. 18, the communication control system 100 is provided in the control station apparatus 264. Since emergency calls are collectively controlled by the control station apparatus 264 installed in the central office, system maintenance can be facilitated.

Figure 20:
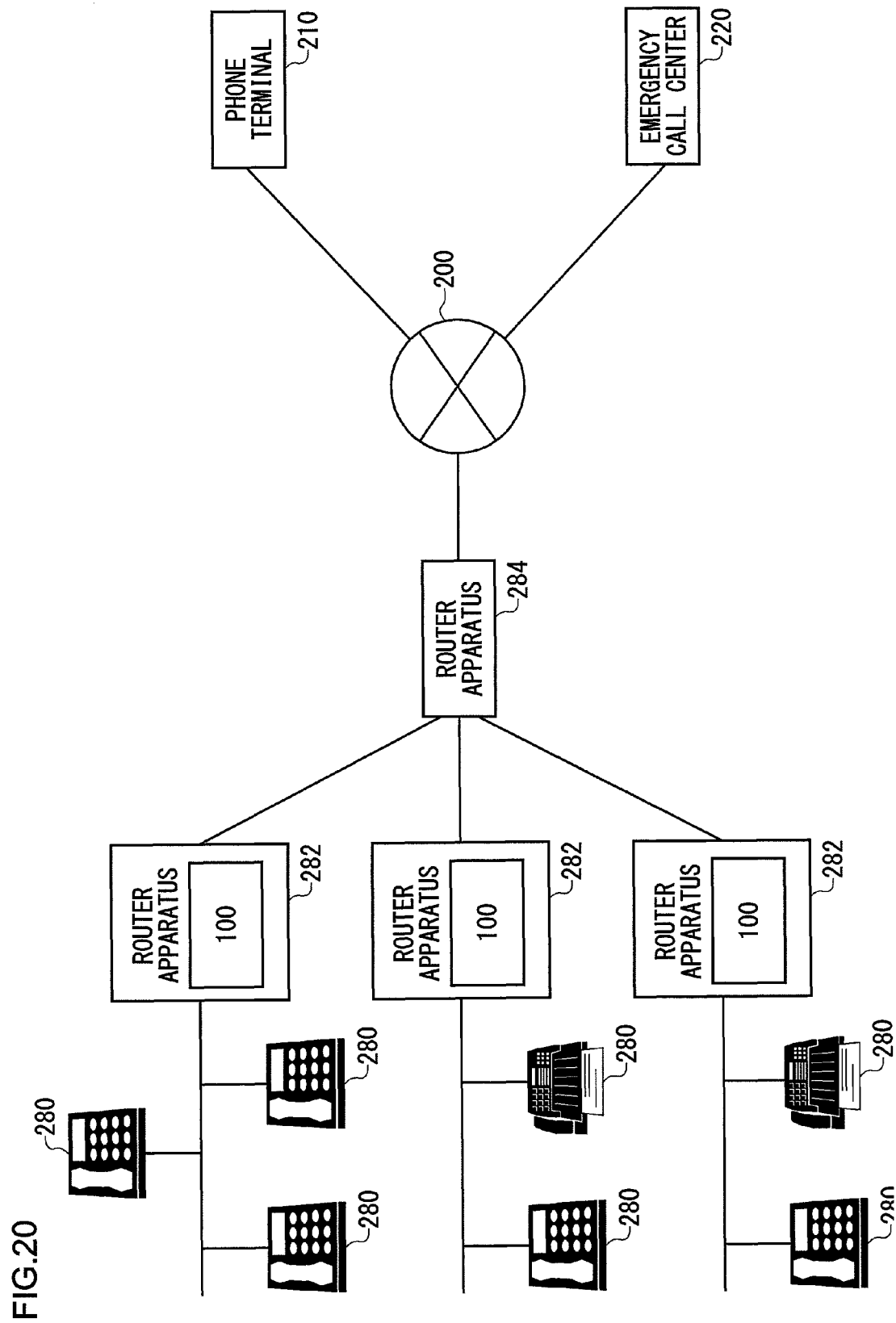
FIG. 20 is a diagram that shows yet another illustrative arrangement of the communication control system.
Figure 21:
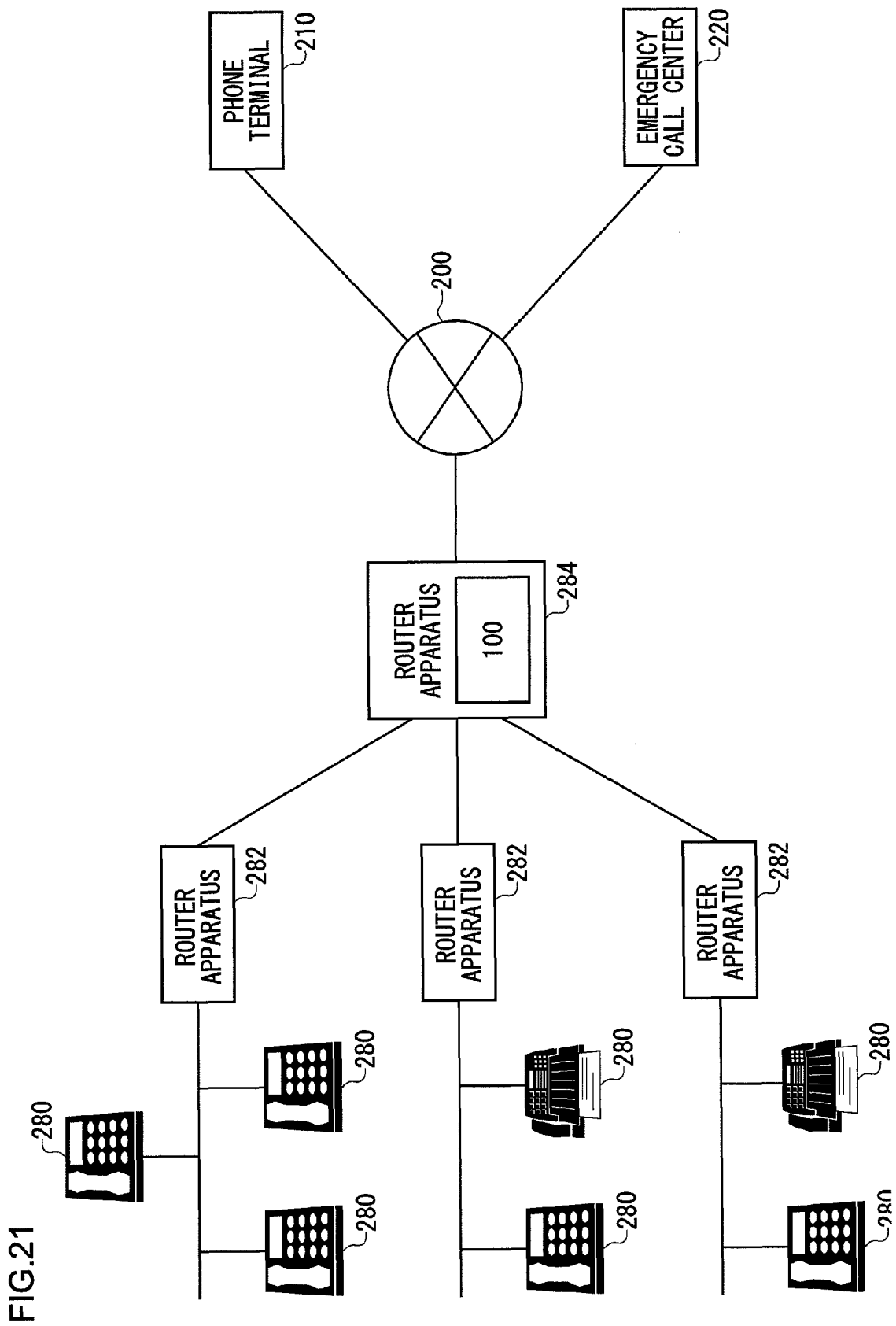
FIG. 21 is a diagram that shows still yet another illustrative arrangement of the communication control system.

FIGS. 20 and 21 show further illustrative arrangements of the communication control system. These diagrams show examples in which IP phone terminals 280 connected to the Internet are used as phone terminals. Communication data from an IP phone terminal 280 is transmitted, via router apparatuses 282 and 284 in a LAN or WAN, to the Internet 200 and then reaches a phone terminal 210 of the call destination or an emergency call center 220. FIG. 20 shows an example in which the communication control systems 100 are provided in the router apparatuses 282, while FIG. 21 shows an example in which the communication control system 100 is provided in the router apparatus 284. The communication control system 100 may be provided by a telecommunications carrier or an ISP.

Although the examples cited above show examples in which the communication control system 100 is built into apparatuses constituting a network, the communication control system 100 may be provided in any position in a network besides these apparatuses.

Figure 22:
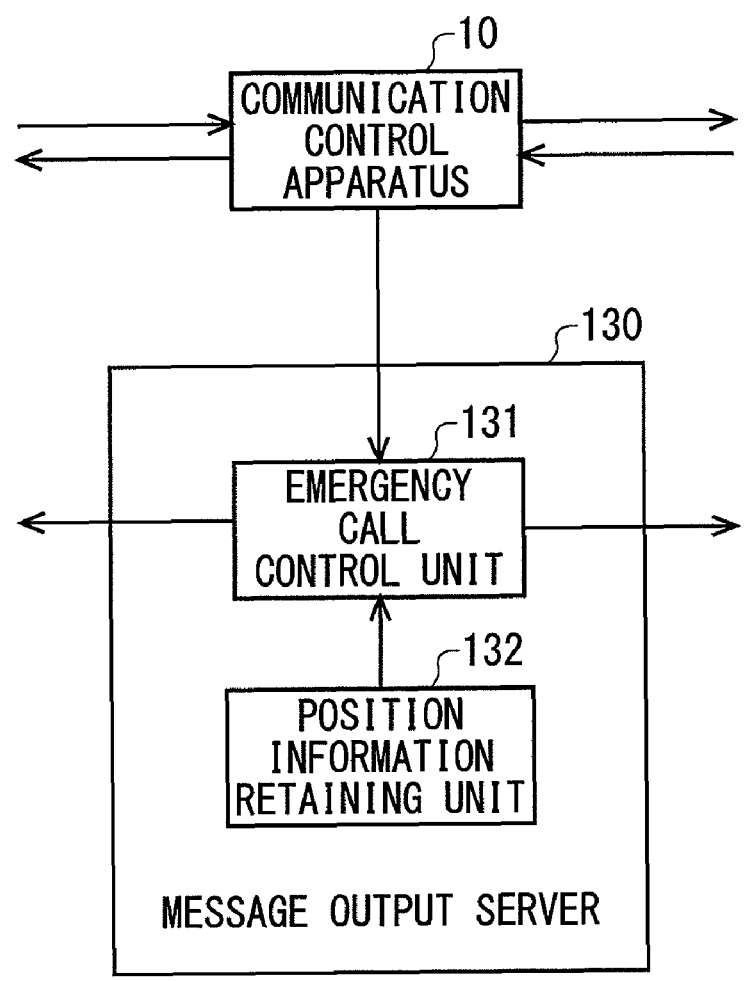
FIG. 22 is a diagram that shows a configuration of the communication control system according to the embodiment.

FIG. 22 shows a configuration of the communication control system according to the embodiment. In the communication control system 100 of the present embodiment, the message output server 130 comprises an emergency call control unit 131 and a position information retaining unit 132. Other configurations and operations are the same as those of the communication control system 100 according to the base technology shown in FIG. 1. When the communication control apparatus 10 detects communication data originating an emergency telephone number, the emergency call control unit 131 controls the conversation of the emergency call. The position information retaining unit 132 retains information about the position of a phone terminal originating a phone call or the position of the communication control system 100. Such position information is added by the emergency call control unit 131, which also functions as a position information addition unit, to communication data to be transmitted to an emergency call center 220. Accordingly, the emergency call center 220 is notified of the position information.

In the communication control system 100 shown in FIG. 20 or 21 for which IP phone terminals 280 are used to make emergency calls, the position information retaining unit 132 may store information including zip codes, address codes and addresses. Such information may be information on the position of the communication control system 100 or may be information on the position of the individual IP phone terminal 280. In the latter case, the position information retaining unit 132 may store the telephone number of an IP phone terminal 280 possessed by a registered user of a telecommunications carrier and may also store the zip code, address code and address of the user. In this instance, the position information retaining unit 132 may be used as the first database 50 of the communication control apparatus 10 so that the search circuit 30 searches the database for the telephone number of an IP phone terminal 280 originating an emergency call, thereby acquiring the position information of the IP phone terminal 280. In the communication control system 100 shown in FIG. 18 or 19 for which cellular phone terminals 260 are used to make emergency calls, the position information retaining unit 132 may store the latitude, longitude, and accuracy information of the base station apparatus 262. In such case, latitude and longitude may be expressed to five decimal places in units of degrees, and accuracy information may be given in meters.

FIG. 23 is a sequential diagram that shows a procedure of a communication control method according to the embodiment. FIG. 23 shows the procedure by which the communication control system 100 establishes a connection with a phone terminal originating a phone call. Although it is mainly predicated on the three-way handshake via TCP/IP, this procedure may also be applied to other communication protocols. If the phone terminal originating a call is a cellular phone terminal 260, this procedure may be skipped.

When a user calls an emergency telephone number, the phone terminal 280 of the user originating the call transmits a "SYN" packet for requesting a connection to a destination to which the emergency telephone number belongs (S10). The communication control apparatus 10 acquires the "SYN" packet and refers to the first database 50, which stores a list of emergency telephone numbers, so as to determine if the telephone number of the call destination is an emergency telephone number using the search circuit 30 (S12). If the telephone number of the call destination is an ordinary telephone number, the communication control apparatus 10 will transmit the "SYN" packet to the Internet so as to send the packet to the phone terminal 210 of the call destination. If the telephone number of the call destination is an emergency telephone number, the communication control apparatus 10 will notify the emergency call control unit 131 thereof (S14).

Upon notification of an emergency phone call, the emergency call control unit 131 issues a "ping" command to the phone terminal 280 originating the call in order to confirm the existence of such phone terminal (S16). When receiving the "ping" command, the phone terminal 280 originating the call returns a response thereto (S18). If there is no response from the phone terminal 280 originating the call, the emergency call control unit 131 will discard the "SYN" packet and forbid the emergency call from being connected because the IP address or telephone number may have been possibly forged. This can prevent someone from impersonating the caller of an emergency call.

Upon confirming, through the "ping" command, that the communication with the phone terminal 280 originating the call can be established normally, the emergency call control unit 131 transmits a "FIN" packet to the phone terminal 280 (S20). A "FIN" packet is generally issued when a connection is required to be terminated, so that the phone terminal 280 originating the call places the connection in a half-closed state (CLOSE_WAIT) or enters an idle state to wait for packet retransmission (TIME_WAIT) in preparation for terminating the connection. In the meantime, the emergency call control unit 131 transmits, to the phone terminal 280 originating the call, a "SYN/ACK" packet for acknowledging the connection request from the phone terminal 280 and requesting the establishment of a connection (S22). The phone terminal 280 originating the call then transmits to the emergency call control unit 131 an "ACK" packet for acknowledging the request (S24). Thus, in place of the phone terminal of the call destination, the emergency call control unit 131 establishes a connection with the phone terminal 280 originating the call. This prevents the phone terminal 280 originating the call from terminating the conversation and enables an emergency call center to call the caller through the emergency call control unit 131. That is, the requirement (2) recited previously can be achieved.

FIG. 24 is a sequential diagram that shows another procedure of the communication control method according to the embodiment. FIG. 24 shows the procedure by which the communication control system 100 controls the conversation between a phone terminal 260 or 280 originating a phone call and an emergency call center 220. After establishing a connection with a phone terminal 260 or 280 originating a call, the emergency call control unit 131 selects an emergency call center to connect to (S30). In a communication control system 100 shown in FIG. 18, since the cellular phone terminal 260 originating the call is used within a few hundred meters of the base station apparatus 262, the emergency call control unit 131 selects an emergency call center the jurisdiction of which covers the position where the unit itself is placed based on the telephone number of the call destination. In the communication control system 100 shown in FIG. 19, the emergency call control unit 131 refers to position information added by another communication control system 100 provided in a base station apparatus 262 to communication data so as to determine the position of the cellular phone terminal 260 originating the call, as will be described later. Subsequently, the emergency call control unit 131 selects an emergency call center the jurisdiction of which covers the determined position of the cellular phone terminal 260 originating the call based on the emergency telephone number of the call destination. In a communication control system 100 shown in FIG. 20 or 21, the emergency call control unit 131 refers to position information added to communication data transmitted from the IP phone terminal 280 originating the call so as to determine the position of the IP phone terminal 280, as will be described later. Subsequently, the emergency call control unit 131 selects an emergency call center the jurisdiction of which covers the determined position of the IP phone terminal 280 originating the call based on the emergency telephone number of the call destination. Thus, there can be established a connection with an emergency call center the jurisdiction of which covers the position of the phone terminal originating the call. That is, the requirement (1) recited previously can be achieved.

After selecting an emergency call center, the emergency call control unit 131 adds the telephone number of the phone terminal originating the call and the position information retained by the position information retaining unit 132, to communication data for calling the phone terminal of the emergency call center (S32). If there has already been position information added by a preceding communication control system 100, the emergency call control unit 131 may not necessarily add the position information or may further add the position information. In the latter case, the communication path from the phone terminal originating the call to the emergency call center can be traced. Thus, the telephone number and position information of the caller can be communicated to the emergency call center, thereby achieving the requirement (3) recited previously.

The emergency call control unit 131 transmits to the emergency call center the communication data with the position information added thereto and calls the phone terminal of the emergency call center (S34). The emergency call control unit 131 may call the phone terminal of the emergency call center via an IP telephone network using the Internet, or via a fixed telephone network or a leased line. After a connection with the emergency call center is established (S36), the emergency call control unit 131 relays the conversation between the phone terminal originating the call and the emergency call center to control the communication (S38).

When the emergency call center issues a release message (S40), the emergency call control unit 131 disconnects from the phone terminal originating the call (S42) and subsequently disconnects from the emergency call center (S44). Thus, the connection between the phone terminal originating the call and the emergency call center is terminated. The emergency call control unit 131 does not disconnect from the phone terminal originating the call before receiving a release message from the emergency call center. Accordingly, the requirement (2) recited previously can be achieved.

Multiple communication control systems 100 which each have the function of adding its position information may be provided on a communication path, so that each time communication data passes through a communication control system 100, the position information of the communication control system 100 is added to the communication data. For example, a communication control system 100 may add its position information posterior to position information added by a preceding communication control system 100. Accordingly, the path through which communication data passes can be traced.

Although information providing the position of a communication control system 100, which is retained by the position information retaining unit 132, is added to communication data in the present embodiment, the information may be identification information of a base station apparatus 262, a control station apparatus 264, or a router apparatus 282 or 284 that comprises the communication control system 100, or the information may be GPS information sent by a phone terminal originating a call. Alternatively, the position of a phone terminal originating a call may be computed by triangulation or the like based on position information of multiple base station apparatuses 262 communicating with the phone terminal originating the call, so that the position information thus computed can be added to communication data.

The present invention has been described with reference to the embodiment. The embodiment is intended to be illustrative only and it will be obvious to those skilled in the art that various modifications to constituting elements or processes could be developed and that such modifications are also within the scope of the present invention.

Industrial Applicability

The present invention is applicable to a communication control apparatus that controls communication via a network.

The invention claimed is:

1. A communication control apparatus, comprising:
a database which stores identification information of an emergency call;
a search circuit which acquires communication data from a first connection request and searches the database for the identification information of a first terminal that is a transmission destination of the first connection request; and
a control unit which, when the identification information of the first terminal is found in the database, transmits a connection termination request to a second terminal that is a transmission source of the first connection request, further transmits a second connection request to the second terminal to establish a connection with the second terminal before establishing a connection with the first terminal, thereafter establishes a connection with the first terminal, and relays communication data between the first terminal and the second terminal.

2. The communication control apparatus of claim 1, wherein the control unit confirms, before establishing a connection with the second terminal, that connection with the second terminal can be established normally, and, when there is no response from the second terminal, the control unit forbids the establishment of the connection.

3. The communication control apparatus of claim 2, wherein the control unit transmits a FIN (Finish) packet to the second terminal before establishing a connection with the first terminal, and further transmits a SYN/ACK (Synchronize/Acknowledge) packet to the second terminal to establish a connection with the second terminal.

4. The communication control apparatus of claim 2, the apparatus being configured with a wired logic circuit.

5. The communication control apparatus of claim 1, wherein the control unit transmits a FIN (Finish) packet to the second terminal before establishing a connection with the first terminal, and further transmits a SYN/ACK (Synchronize/Acknowledge) packet to the second terminal to establish a connection with the second terminal.

6. The communication control apparatus of claim 5, the apparatus being configured with a wired logic circuit.

7. The communication control apparatus of claim 1, wherein the apparatus being configured with a wired logic circuit.

8. A communication control method, comprising:

acquiring communication data from a first connection request and searching, identification information of a first terminal that is a transmission destination of the first connection request, a database storing the identification information of an emergency call; and transmitting a connection termination request to a second terminal that is a transmission source of the first connection request, further transmitting a second connection request to the second terminal to establish a connection with the second terminal before establishing a connection with the first terminal, thereafter establishing a connection with the first terminal, and relaying communication data between the first terminal and the second terminal to control communication between the first terminal and the second terminal, when the identification information of the first terminal is found in the database.

* * * * *